(12) United States Patent
Barone

(10) Patent No.: US 7,990,389 B2
(45) Date of Patent: Aug. 2, 2011

(54) GRAPHIC SYSTEM COMPRISING A PIPELINED GRAPHIC ENGINE, PIPELINING METHOD AND COMPUTER PROGRAM PRODUCT

(75) Inventor: Massimiliano Barone, Bresso (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 1117 days.

(21) Appl. No.: 11/746,849

(22) Filed: May 10, 2007

(65) Prior Publication Data

US 2007/0285430 A1 Dec. 13, 2007

Related U.S. Application Data

(63) Continuation-in-part of application No. 10/886,528, filed on Jul. 7, 2004, now abandoned.

(30) Foreign Application Priority Data

Jul. 7, 2003 (EP) .................................. 03015269

(51) Int. Cl.
*G06T 13/00* (2011.01)
*G09G 5/00* (2006.01)
*H04N 7/12* (2006.01)
*H04N 11/02* (2006.01)
(52) U.S. Cl. ..... 345/475; 345/474; 345/606; 348/413.1; 348/416.1
(58) Field of Classification Search .................. 345/419, 345/474, 475, 606–610
See application file for complete search history.

(56) References Cited

U.S. PATENT DOCUMENTS

| 5,410,358 | A | 4/1995 | Shackleton et al. ........... 348/459 |
| 6,031,538 | A | 2/2000 | Chupeau et al. ............... 345/419 |
| 6,151,033 | A | 11/2000 | Mihara et al. ................. 345/475 |
| 6,975,681 | B2 * | 12/2005 | Ishikawa ................... 375/240.15 |
| 7,038,676 | B2 * | 5/2006 | Iwata et al. .................... 345/418 |
| 2003/0201994 | A1* | 10/2003 | Taylor et al. ................... 345/581 |

FOREIGN PATENT DOCUMENTS

EP 0675462 10/1995

OTHER PUBLICATIONS

Grammalidis et al., Temporal Frame Interpolation for Stereoscopic Sequences Using Object-Based Motion Estimation and Occlusion Detection, Proceedings of the International Conference on Image Processing, (ICIP), Washington, Oct. 23-26, 1995, Los Alamitos, IEEE Comp., Soc. Press, US, vol. 3, Oct. 23, 1995, pp. 382-385.
Chu et al., Hybrid Object-Based/Block-Based Coding in Video Compression at Very Low Bit-Rate, Signal Processing, Image Communication, Elsevier Science Publishers, Amsterdam, NL, vol. 10, No. 1-3, Jul. 1, 1997, pp. 159-171.

* cited by examiner

*Primary Examiner* — Hau H Nguyen
(74) *Attorney, Agent, or Firm* — Lisa K. Jorgenson; Allen, Dyer, Doppelt, Milbrath & Gilchrist, P.A.

(57) ABSTRACT

A graphic system includes a pipelined graphic engine for generating image frames for display. The pipelined graphic engine includes a geometric processing stage for performing motion extraction, and a rendering stage for generating full image frames at a first frame rate for display at a second frame rate. The second frame rate is higher than the first frame rate. A motion encoder stage receives motion information from the geometric processing stage, and produces an interpolated frame signal representative of interpolated frames. A motion compensation stage receives the interpolated frame signal from the motion encoder stage, and the full image frames from the rendering stage for generating the interpolated frames. A preferred application is in graphic systems that operate in association with smart displays through a wireless connection, such as in mobile phones.

52 Claims, 16 Drawing Sheets

GRAPHIC SYSTEM COMPRISING A PIPELINED GRAPHIC ENGINE, PIPELINING METHOD AND COMPUTER PROGRAM PRODUCT

RELATED APPLICATION

This is a continuation-in-part of U.S. patent application Ser. No. 10/886,528 filed Jul. 7, 2004 now abandoned, the entire disclosure of which is hereby incorporated in its entirety.

FIELD OF THE INVENTION

The present invention relates to techniques for pipelining 3D graphics in a graphic engine for rendering some frames and for extracting motion information and applying them to interpolate new frames. In particular, the present invention is applicable to graphic engines that operate in association with smart displays through a wireless or wired connection.

Exemplary of such an application is the graphic engine in a mobile phone equipped with a wireless (i.e., Bluetooth) or wired connection to a remote display, or within the graphic engine in a mobile phone having an embedded display. However, reference to these preferred applications are in no way to be construed as limiting the scope of the invention.

BACKGROUND OF THE INVENTION

Modern 3D graphic pipelines for graphic engines in graphic cards, like OpenGL and Direct3D pipelines, include a rich set of features for synthesizing interactive tridimensional scenes with a high and realistic quality.

To output frame-rates ranging from 20/30 to 40/100 frames per second, powerful dedicated graphic cards are required having correspondingly high costs. The number of pictures per time unit (i.e., the frame rate) is usually increased by parallelizing as much as possible the operations required in the frame buffer with respect to the graphic objects that are to be displayed, while at the same time increasing the computational power available by running at higher speeds the operations that cannot be parallelized.

A generic OpenGL pipeline for 3D interactive graphics is able to implement a set of algorithms that process a tridimensional synthetic scene, which comprises actions and details and is able to present it on a bi-dimensional display. The process to generate and display the scene, from a conceptual point of view, is divided into more consecutive steps or pipeline stages. Each stage has a specific task and provides the input for the next stage. The complexity of each stage varies from one stage to another. Typically, stages that process and affect pixels (at the end of the pipeline) have a higher complexity than those stages that process the 3D scene details. A full description of a graphic pipeline can be found in an Internet publication at URL http://www.extremetech.com/article2/0,3973,9722,00.asp.

By way of example, approximately 70% of the computational resources are devoted to raster and fragmentation operations while the remaining resources are absorbed by the geometry stages. This happens because the final shape of each object is obtained by applying on its pixels the same steps many times, while other operations are executed only once for each 3D object.

For a 3D pipeline, it is highly desirable to use as small a number of operations as possible while achieving a good level of detail and ensuring a minimum frame rate. SD objects that are located and displaced within a tridimensional space of coordinates compose a 3D scene. Each object is composed of a number of graphic primitives (i.e., triangles).

The appearance of this object depends on the number of primitives. The level of detail perceived from a visual point of view increases with the number of such primitives. A geometric primitive should be a simple entity that can be easily processed by a real pipeline by an algorithm depending on the geometric type of primitive, i.e., points, lines, triangles, squares, polygons and higher-order surfaces.

Excluding lines and points, a suitable object representation is provided by triangles, and consequently, the use of triangles will be assumed in the following discussions. In fact, a triangle is a simple planar, convex surface that can be processed fairly easily. Its vertices univocally define each triangle. Each 3D scene can thus be completely defined by a list of vertices. These are tridimensional points located within a reference coordinate system, and such vertices/points are associated to respective primitives.

Each vertex can be defined by associating the following information: X, Y, Z real coordinates and R, G, B color components. Additional information not needed for the nature of the proposed algorithm are as follows. One or more alpha factors are not needed. Three real coordinates to specify the normal vector associated to the vertex are not needed. The normal vector is used by the lighting stage to apply a luminosity value to the primitive. Two or more coordinates used as addresses of two or three suitable maps are not needed, from which pixel information that is associated to the vertices to contribute to their final color are extracted.

To locate a 3D object within a scene, certain geometric transformations are needed, that can be based upon simple affine transformations like rotations, translations, scaling, etc. Each object can be displaced independently from the others by transforming its vertices at a certain time. Natural motion is achieved by carefully applying sequences of transformations to obtain a discrete-linear approximation of real continuous motion. Such transformations are not incremental with respect to the previous ones. The position of the object at a certain time is obtained by applying transformations to the object geometry considered at an initial time.

The viewpoint is also specified, which can be regarded as a window through which the 3D scene is watched. Global motion is a result of the object motion and the motion (if any) of the viewpoint. Alternatively, the viewpoint can be seen as a camera that samples the 3D scene. The 3D scene is displayed on a monitor by a bi-dimensional grid of pixels, each being associated by colors. Certain operations are applied to the pixels before they are displayed. These operations are the most demanding in terms of computational power.

The pixels compose a frame that is a snapshot from the camera viewpoint. A typical frame-rate of 20-30 frames per second (fps) is needed to achieve a fluid motion perception by the viewer. Different Cartesian reference systems are used in a 3D pipeline. They are as follows: a model space, a world space, a view space, a clip space, and a screen space.

In the model space, each model is a "local" reference system having for example, the lowest point as its origin to the 3D object. In the world space, all models are arranged within this unique system (OpenGL does not use it). Within the view space (or camera space) the viewpoint is placed at a "world space" point. The "world space" is transformed to have the "camera space" with the camera placed at its origin and directed to the negative z-axis.

In the clip space, it is possible to detect what primitives are visible using the "clipping" process and send them through the pipeline. The "clip" space is a space obtained due to a perspective transform to have a "view volume". It projects visible 3D objects on a bi-dimensional plane with a projection center placed at the camera itself (projective transform) or at infinity (orthogonal transform). In OpenGL, the "view volume" is normalized as a unitary cube defined by two vertices of (−1, −1, −1) and (1, 1, 1) coordinates in order to have more efficient clipping operations. A primitive with "clip" space coordinates within the cube is potentially visible.

In the screen space the 3D primitive coordinates in the "clip" space are re-scaled into 2D screen coordinates depending on the real screen resolution. In FIG. 1 a block diagram is shown, illustrating a typical 3D graphic system 100 and its different stages.

A useful general classification of the processing steps (operations) in such stages is based on the input type that is processed by each stage. Consequently, the pipeline operations can be classified in the following modes: per-vertex operations and per-triangle operations.

The per-vertex operations are applied on vertices associated to each primitive that composes the scene. Geometric transforms are examples of these operations. The per-triangle operations are applied on the primitives that compose the scene. Exemplary of these are "clipping" and "culling." The former defines the part of the primitives within the "view volume" and depending on the resulting intersection clipping defines how these are cut while the latter operation determines if they are located outside the "view volume" or back facing the "view point".

Per-pixel or per fragment operations operate directly on pixels. Exemplary of these are rendering, per-pixel lighting, per pixel texturing, fragmentation operations where one or more fragments are associated to each pixel. Another difference with respect to the other operations is that "per-pixel" or "per fragment" operations can be applied repeatedly to the same pixel displayed. This is the main reason why highly complex operations reside at this stage. In fact, they will influence also the frame rate.

On the basis of the above definitions, the 3D graphic system 100 shown in FIG. 1 can be subdivided in four main stages: an application/scene stage 101, a geometry stage 111, a triangle setup stage 112, and a rendering/rasterization stage 113. The geometry stage 111, the triangle setup stage 112 and the rendering/rasterization stage 113 are part of a pipelined graphic engine 110.

Lights 107 and textures 108 are the input information regarding 3D objects 106 to the application/scene stage 101. Operations in the application/scene stage 101 are defined and set by the programmer using API (Application Protocol Interface). OpenGL is an example of API. Typically the operations implemented are database management, motion set-up of 3D objects and camera, description of the content of a 3D animation, controls of primitive visibility (occlusion culling), and level of scene details (LOD, the number of primitives used to render the 3D scene).

The geometry stage 111 is the first pipeline stage. The associated operations are mainly "per-vertex" operations. It includes operations suitable for moving 3D objects. Motion is obtained by applying geometric transforms to vertices of the primitives in each single object of the scene. Transforms are of the affine type and defined in an affine space where two entities are defined: points and vectors. Results of the transformations are vectors or points.

The transforms used in a 3D pipeline can be grouped in two main families, i.e., rigid body transforms and project transforms. In rigid body transforms, i.e., roto-translation plus scaling is where the results are still within the 3D space. In project transforms (prospective, orthogonal etc.), a primitive is moved from the 3D space to the 2D space where those objects are located that will be shown on the screen.

These transforms use suitable square 4×4 arrays. Each affine transform can be obtained by properly defining each coefficient in such arrays. In the geometry stage 111 other operations such as "culling", "clipping", "screen space transform", "lighting", and "back-face culling" are also implemented, fully or partly, depending on the kind of implementation.

The triangle setup stage 112 performs a step that prepares the following rendering stage 113. In the triangle setup stage 112 operations on data from the geometry stage 111 are organized to compute a new set of data necessary for the next stage. Specifically, a new set of data is generated and associated to each vertex.

By way of example, an incremental scan conversion process can be implemented in the triangle setup stage 112. For each item in the list of triangles that are potentially visible and available from the geometry stage 111, the process locates each triangle over the pixel grid depending also on the Z depth value associated to each vertex.

The rendering/rasterization stage 113 is among the most complex stages from the computational viewpoint within the 3D graphic engine 110. In fact, this stage performs "per pixel" computations that are typically iterated many times to provide the final appearance of each pixel actually displayed.

Operations in the rendering/rasterization stage 113 comprise a shading operation that computes the color of each pixel composing the projected triangle. Different methods exist for implementing 3D shading. Those mostly used are flat shading, gouraud shading and phong shading. These methods span from low (flat) to high (phong) complexity and in the realism achieved.

Other operations include depth cueing, texture mapping, antialiasing and rasterization. Rasterization draws the current frame with the colors computed during the shading operation by addressing pixels within a frame segment and pixels within a triangle. The order of the operations involved depends on the specific implementation. However, the outcome of the operations performed in the stages from 101 to 113 is finally supplied to a display frame device 130.

The description above highlights that the rendering stage 113 operates "per-pixel" and it is the stage in which the most part of the complexity resides. The workload of the rendering stage 113 influences the frame rate that can be achieved at the display 130 side. When the maximum workload that the rendering stage 113 can sustain is fixed, then the complexity of an application in terms of number and type of primitives may temporarily exceed the fixed computational power, thus originating a variable time for rendering a frame and variable frame rate. The same happens if algorithms with different complexities (such as the various shading techniques) are used at different times.

An approach for obtaining a natural motion, while achieving a sufficient frame rate, is to decrease the number of primitives submitted to the pipeline or simplify the algorithms used. However, this will decrease the level of quality obtained. Allowing the pipeline to vary the frame rate with respect to a minimum value is known as an approach that preserves natural motion, ensures a minimum frame-rate and keeps the quality at good levels.

If the obtained rate is below such a minimum value, a "frame rate up conversion" technique is applied to increase the frame rate to ensure that minimum rate. For example, if the frame rate is 10 frames per second, the pipeline should render at its output 10 frames per second, or better, one frame per $1/10$ of second. If the pipeline can render only an integer number of n frames per second, while a number $n_1 > n$ of frames is required at its output, the frame rate up-conversion factor required is equal to the ratio $n_1/n$.

Methods are known that start from n rendered pictures and interpolate a number $n_1$ minus n of frames per second to increase the frame rate from n to $n_1$. A temporal frame averaging method is one known method. It is a very simple method, but the resulting quality is very poor.

Assuming that a pipeline is to provide an integer number n of frames, every frame f (with f=1 ... n) is an image having X by Y pixel resolution, with X indicating the number of horizontal pixels and Y the number of vertical pixels. At each pixel (i,j) with i=0 ... X−1 and j=0 ... Y−1 of the f frame, an item of information $C_{(i,j)}(f)$ is associated using P bits. Then each frame f will require (X by Y by P) bits to be stored in the frame buffer.

Assuming that r is the minimum number of frames to display per second (i.e., the minimum frame-rate required, that typically ranges between 20 and 30 fps), if the pipeline is not able to ensure a minimum frame rate r, then the pipeline would render only a number $n_1$ frames, with $n_1 > n$, using the averaging method to generate the remaining $(n_1 - n)$ frames from n.

For example, the relationship $(n_1 - n) = n_1/2$ frames would apply. Even frames f=2, 4, 6 ... are interpolated using odd frames f−1 and f+1 as follows: $C_{(i,j)}(f)$ is the color of the pixel (i,j) of the frame f, $C_{(i,j)}(f-1)$ is the color of the pixel (i,j) of the frame f−1, and $C_{(i,j)}(f+1)$ is the color of the pixel (i,j) of the frame f+1. Then:

$$C_{(i,j)}(f) = \frac{C_{(i,j)}(f-1) + C_{(i,j)}(f+1)}{2}$$

which is done per each pixel (i,j) of the frame f, with i=0 ... X−1 and j=0 ... Y−1. A major limit of temporal frame averaging lies in that no correction in the motion direction is available, even if possibly needed.

Another known approach uses a motion estimator at the output of the graphic pipeline to estimate per pixel the motion information and correct the result of temporal averaging by using motion compensation techniques. A motion estimator would generate a motion vector per pixel. This however requires more computational power and memory.

The drawbacks just described regarding 3D pipelines known in the art are particularly relevant when the 3D pipeline is to be included in a graphic card of a device like a mobile phone with an embedded display. It can also be connected to a remote smart display, e.g., for playing 3D games or running various graphic applications using a reduced bitrate wireless or wired transmission channel.

FIG. 2 shows an application where a graphic system 100 for a mobile phone receives graphic instructions I from the 3D application 101. On the basis of such instructions, the 3D engine 110 generates at its output fully rendered frames KF at a full rate F1. Each frame KF is represented by a bi-dimensional matrix of N rows by M columns, where each intersection between rows and columns defines a color represented by its R, G and B values coded over P bits.

Such frames KF can now be sent to an embedded display or, as shown in FIG. 2, sent to a transmitter stage 120 that, using a wireless or wired connection, transmits them in the form of a bitstream R1 towards a remote smart display device 130. The remote smart display device 130 will receive the bitstream R1 through a receiver stage 135 that outputs the fully rendered frames KF at the full rate F1. These represent the bi-dimensional matrix described in the foregoing including N×M colors (RGB) at a rate of F1 frames per second.

The bitrate of the bitstream R1 is then equal to N*M*P*F1 bits per second. By way of example, for a VGA picture having a resolution of 640×480 pixels the following values are used: N=640, M=480, P=16, F1=30, resulting in a bit rate of 140.6 Mbit/s. Such a bitrate is too high to be transmitted by resorting to current wireless or wired transmission standards that use transmission rates from hundreds of kbit/s to Mbit/s. Different architectures have been proposed to obtain more efficient compression schemes.

Approaches are known to transmit bitstreams at a reduced bitrates using a video encoder, e.g., a MPEG2/4 or JPEG encoder. This can be connected between the 3D engine and the transmitting module to achieve a lower bandwidth during transmission. Of course, an MPEG2/4 or JPEG decoder is needed between the receiving module and the display unit (e.g., a screen) on the display side. These approaches are penalized by their complexity related to the architecture of JPEG/MPEG encoders and decoders. Furthermore, all these blocks process frames at full frame rate, and also introduce a very high latency thus making it difficult to play latency-sensitive application like games.

Other approaches are known where the 3D engine produces frames to be fed to a motion estimator that considers each even frame. This is done with respect to the order of output from the 3D engine and by predicting the motion with respect to the previous and following odd frame. A plurality of motion vectors associated to each RGB pixel included in the even frames is then produced.

The motion vectors are then coded using a Mvencoder device and transmitted to the smart display on the wireless connection. The Mvencoder device computes the differences between motion vectors, and then encodes these differences using a variable length code. This technique is widely used in the MPEG2/4 standards.

The odd frames are also fed to a video encoder that processes them at a lower frame rate. However, to run the task in the frame buffer, the motion estimator should store the above-mentioned frames. While a video encoder can be simpler than an MPEGF2/4 or JPEG encoder, the motion estimator makes the system very expensive in view of the complexity of the functions it performs, the need for a frame buffer, and the need of processing process frames at the full rate output by the 3D engine.

SUMMARY OF THE INVENTION

An object of the present invention is to provide a graphic engine, adapted to permit transmission toward a display unit at a reduced rate, through simpler circuits and at a lower cost.

According to the present invention, the above object is achieved by a graphic system comprising a pipelined tridimensional graphic engine having the characteristics referred to specifically in the claims that follow. The invention also relates to a corresponding pipelining method, as well as to a computer program product that may be loaded in the memory of a computer and comprising software code portions or data fields for performing the method of the invention when the product is run on a computer.

Substantially, the approach described herein provides a graphic engine that generates locally fully rendered frames at a reduced frame rate while producing additional motion vector information, without motion estimation, that feeds a motion compensation stage that can be locally or remotely placed with respect to the graphic engine. In the last case, motion information and fully rendered frames are compressed and sent by a wired or wireless connection to a remote smart display unit. There, such information is used along with the fully rendered frames for generating interpolated frames based upon a motion compensation stage.

As a result, a sensible reduction in terms of complexity is achieved in comparison with the prior art. Also, motion estimation is not required on the graphic engine side. A system architecture to divide the features of the graphic engine and the smart display is also proposed as well as an approach fully local to the graphic engine.

A display unit may be associated with the system for displaying the image frames at the second frame rate. The graphic system may be at least partially integrated as a self-contained device with the display unit.

BRIEF DESCRIPTION OF THE DRAWINGS

The invention will now be described, purely by way of non-limiting examples, with reference to the attached drawings, wherein.

DETAILED DESCRIPTION OF THE PREFERRED EMBODIMENTS

In the arrangement described herein, the workload of a graphic engine is reduced by generating a set of fully rendered frames at a reduced frame rate. The graphic engine further produces additional motion vector information. The motion vector information is extracted from the graphic pipeline at a point where this information is already directly available, without using motion estimators. A complete sequence of frames at a full frame rate is recreated starting from the fully rendered frames at a reduced frame rate. These frames are received, decoded and then used as base information to recreate the interpolated frames for obtaining a full frame rate. Predictions are obtained using the motion vectors that are used to address them. Predictions are subject to temporal averaging to create frames that, grouped to the reduced ones in the display order, compose the full frame set.

Figure 3:
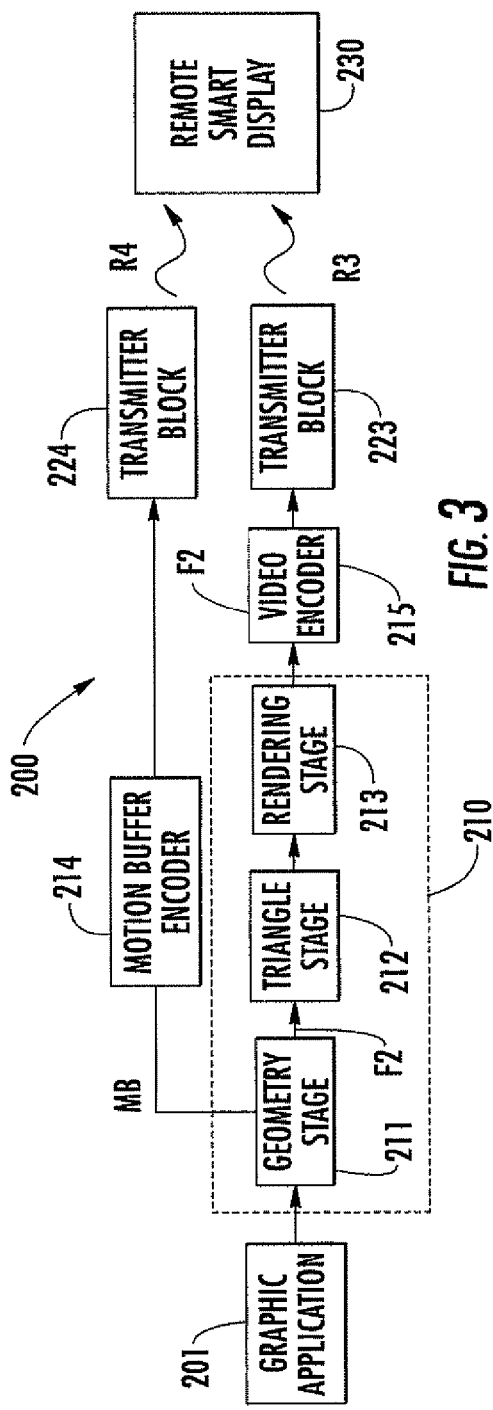
FIG. 3 represents a block diagram of a graphic system according to the invention.

FIG. 3 shows a graphic system 200. A graphic application 201 supplies instructions I to a 3D engine 210. This operates by generating fully rendered frames KF at a reduced frame rate F2, lower than the full frame rate F1 that needs to be achieved at the display side. Thus, interpolated frames IF are needed to achieve a full frame rate.

Interpolated frames are produced using the information stored in the motion buffers and the rendered frames. Optionally, if the motion compensation stage is placed into the remote smart display, the interpolated frames IF are not produced at the output of the 3D engine 210, but remotely. A motion buffer encoder 214 is provided in this case to associate each RGB pixel of the future and remotely interpolated frames IF with motion buffer information MB, originated by the 3D engine 210 and sent to the motion buffer encoder 214.

The motion buffer encoder 214 computes the difference between incoming motion vectors. The difference is then coded using a variable length code (VLC) in the form of coded motion buffer information in a bitstream R4 that is sent through a transmitter block 224 on a wireless or wired channel to a remote smart display 230. A video encoder 215 encodes the fully rendered frames KF output at a full rate F2 by the 3D engine 210 and sends a bitstream R3 to a transmitter block 223 that transmits such a bitstream R3 to the smart display 230.

For example, considering a frame comprised of a bi-dimensional matrix of N rows by M columns of RGB colors at a reduced frame rate F2 and using a compression method adapted to compress 24 bits to 6 bits, the bitstream R3 has a rate equal to (N*M*6*F2). Consequently for QCIF picture resolution: N=176, M=144, F2=1S and R3 is 2.175 Mbit/s; for QVGA picture resolution N=320, M=240, F2=15 and R3 is 6.59 Mbit/s; and for CIF picture resolution N=352, M=288, F2=15 and R3 is 8.7 Mbit/s.

Since the bitstream R4 has a rate typically negligible with respect to the rate of bitstream R3, the total bitrate can be transmitted on a wireless connection (such as a Bluetooth or 802.11 standard link) or wired connection, whose bitrate spans from hundreds of kbit/s to some Mbit/s. Furthermore, a suitable compression scheme, like compression schemes described in European Patent applications no. 2003002728 or no. 2003002205, can ensure a low delay, lower for instance than the delay encountered in a MPEG2/4 or JPEG encoder.

FIG. 3 shows that the graphic engine 210 comprises a geometry stage 211, a triangle stage 212 and a rasterization stage 213. Motion buffer information MB is obtained primarily from the geometry stage 211, as better detailed in the following, without using a motion estimator.

Figure 4:
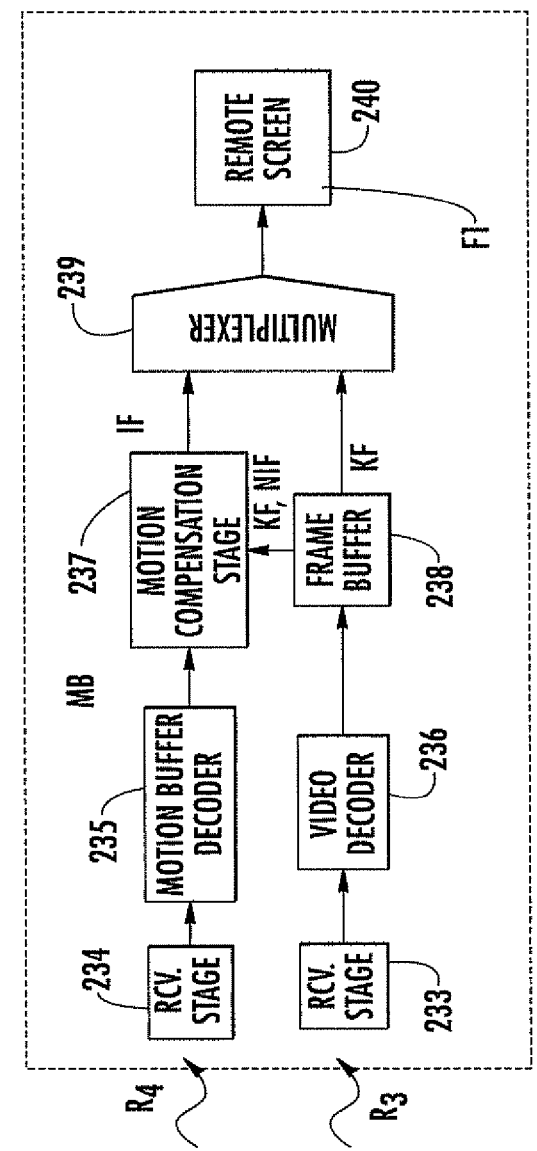
FIG. 4 represents in greater detail a portion of the graphic system of FIG. 3.

FIG. 4 shows a block diagram of the smart display 230 comprising two receivers 233 and 234 for the bitstreams R3 and R4, respectively. The receiver 234 is followed by a motion buffer decoder 235 that decodes the motion buffer information MB. For each variable length code, the motion buffer decoder 235 outputs a fixed variable code. This is added to the already decoded, previous code in order to recreate the original motion buffer information MB. The motion buffer information MB is then fed as input to a motion compensation stage 237.

The bitstream R3, containing the fully rendered frames KF at a frame rate F2 after the receiving stage 233, is decoded through a video decoder 236, corresponding to the video encoder 215. Then all the fully rendered frames KF originated at the reduced frame F2 rate are stored in a frame buffer 239.

The motion compensation stage 237 receives the motion information MB. Each information stored in the motion information MB is associated to the corresponding pixel in the interpolated frame IF, and point at a space location in the reference frame. The pixel color of the interpolated frame IF is reconstructed by averaging the information of the pixels close to the space location pointed from the motion vector.

The interpolated frames IF are then mixed to fully rendered frames KF through a multiplexing device 239 and displayed on a remote screen 240. If a frame rate upconversion process is performed locally between the graphic engine and its display, and not remotely, the same motion compensation procedure described above applies.

In the following, a description is provided of the methods used by the 3D graphic system shown in FIGS. 3 and 4 to carry out motion vector synthesis and picture motion compensation. These methods extract motion vectors from the geometry stage 111 and use them to compensate temporally the un-rendered frames with respect to those frames that were already rendered, i.e., the fully rendered frames KF.

Like the temporal averaging technique, this technique uses one or more frames already rendered by the normal 3D pipeline, i.e., the future and past frames with respect to the frame being interpolated. To perform such an operation, the motion compensation stage 237 is introduced in the 3D pipeline, operating in alternative to the rendering stage 213 at the display side (local or remote smart display).

As already mentioned, the frames at the output of the pipeline belong to two categories, i.e., the fully rendered frames KF and the interpolated frames IF. The motion information MB concerning the 3D scene extracted from the geometry stage 211 is fed as an input to the motion compensation stage 237.

The interpolated frames IF are rendered by the motion compensation stage 237 that uses as predictors the fully rendered frames KF obtained from the video decoder 236. A frame interpolation index NIF is also introduced to indicate how many interpolated frames IF should be generated by the motion compensation stage.

The frame interpolation index NIF can be computed in real time by measuring the global motion of a scene. A high value in this measurement leads to a decrease in the number of interpolated frames IF, while a lower value in this measurement dictates an increase. The index NIF can also be set a priori during the pipeline initialization and kept constant during the execution time of the whole application. In a preferred embodiment, the frame interpolation index NIF is set equal to 1, so that the fully rendered frames KF and the interpolated frames IF are in equal numbers and may be sent in an interleaved way to the display 240

If the motion compensation is local, then it is attached to the rendering stage while if placed remotely at the smart display side the video decoder 236 is coupled to the motion compensation stage 237. This means that, before using the motion compensation stage 237, at least one or two fully rendered frames KF should be decoded by the video decoder 236.

Specifically, in order to generate the interpolated frames IF in succession, a fully rendered forward frame KFF and a backward frame KFB should be available. A backward frame KFB is a reference frame at a later time in display order, while a forward frame KFF is a reference frame at an earlier time in display order.

As its input, the motion compensation stage 237 thus receives a fully rendered frame KF, the frame interpolation index and the motion buffer information MB, and comprises a first buffer (designated a forward motion buffer MBF) associated to a forward frame KFF, and a second buffer (designated a backward motion buffer MBB) associated to a backward frame KFB.

If the index NIF is zero then the pipeline behaves normally, and all the frames are rendered as usual. If the index NIF is equal to a generic value, e.g., n, then for each fully rendered frame KF, n interpolated frames IF should be interpolated by the motion compensation stage 237. By setting the interpolated frame index NIF to a constant value, it is easy to know when the motion compensation stage 237 will interleave frames at the output of the video decoder 236.

Figure 5:
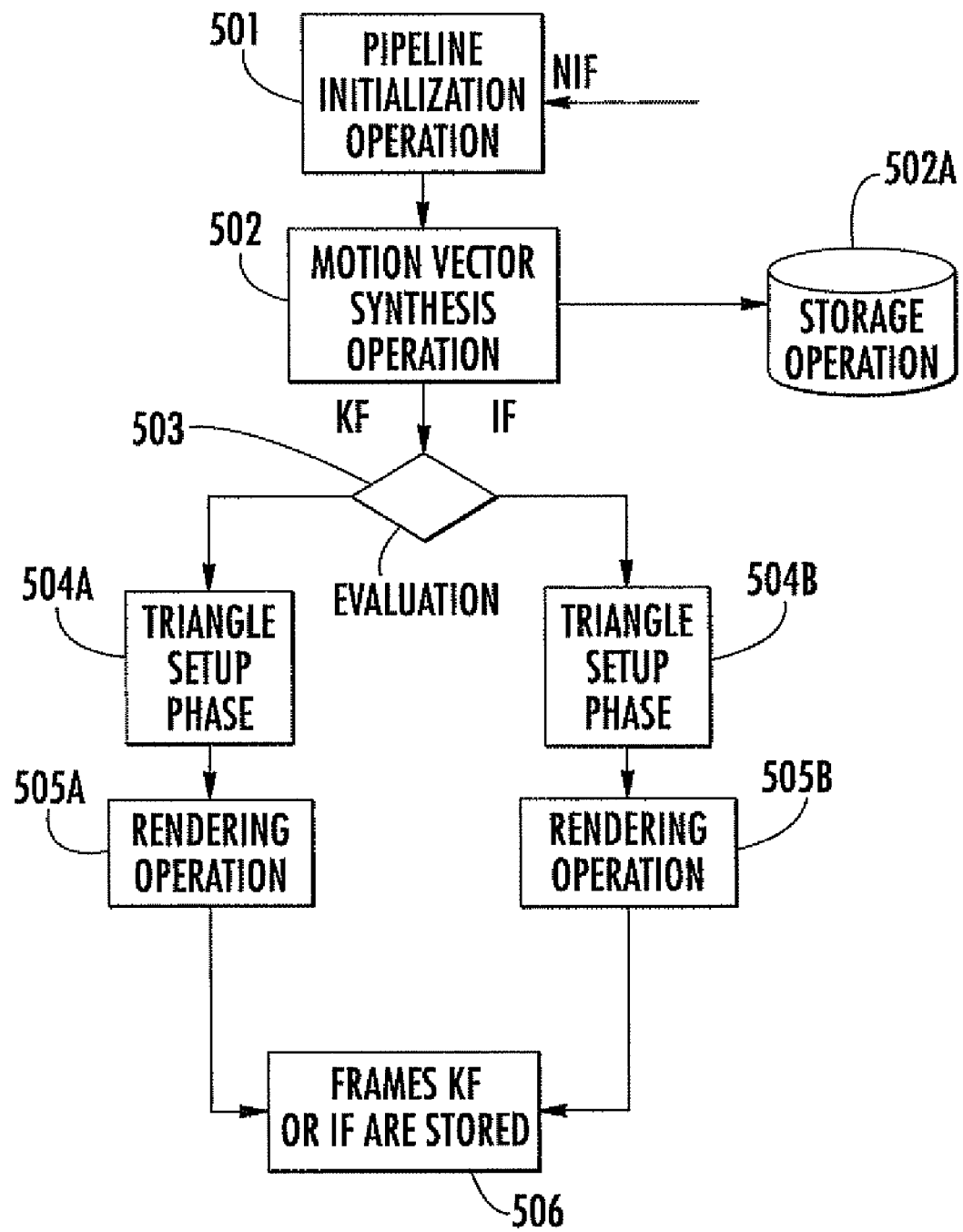
FIG. 5 represents a flowchart of the pipelining method according to the invention.

Operation of the proposed pipelining arrangement will now be described with reference to the flowchart shown in FIG. 5. A block 501 indicates a pipeline initialization operation, in which all parameters, including the index NIF are initialized. The index NIF will then be assumed to be constant for the whole execution time and equal to n.

Control is subsequently passed to block 502. There, a motion vector synthesis operation is performed in the geometry stage 211 with a related storage operation 502A of the results in data structures associated to the vertices. At this point of computation in the pipeline, in a step 503 an evaluation can be made as to whether the frame must be rendered or interpolated. Specifically a triangle setup phase 504A and 504B is performed depending on the outcome of step 503.

Figure 1:
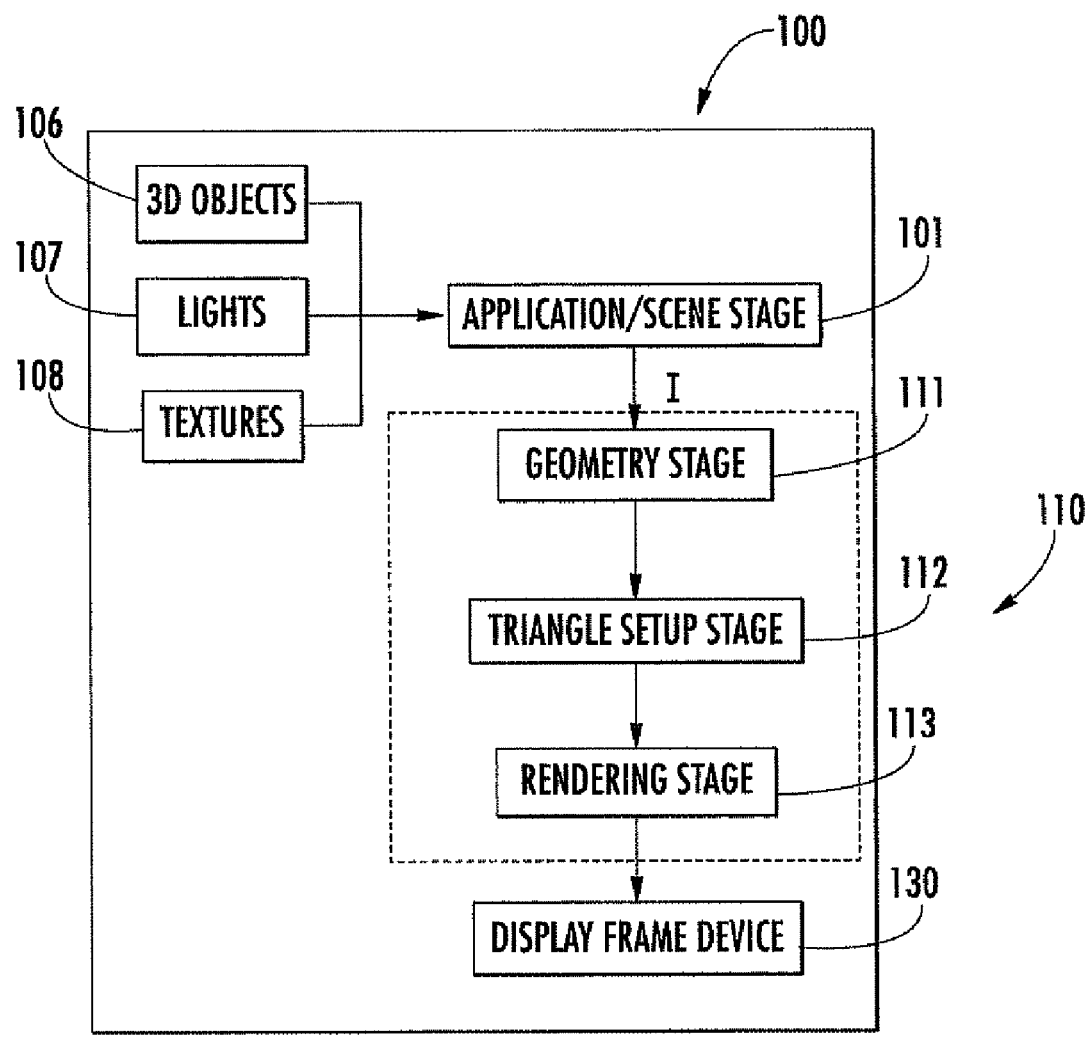
FIGS. 1 and 2 are block diagrams of a graphic system and a remote smart display device according to the prior art.
Figure 2:
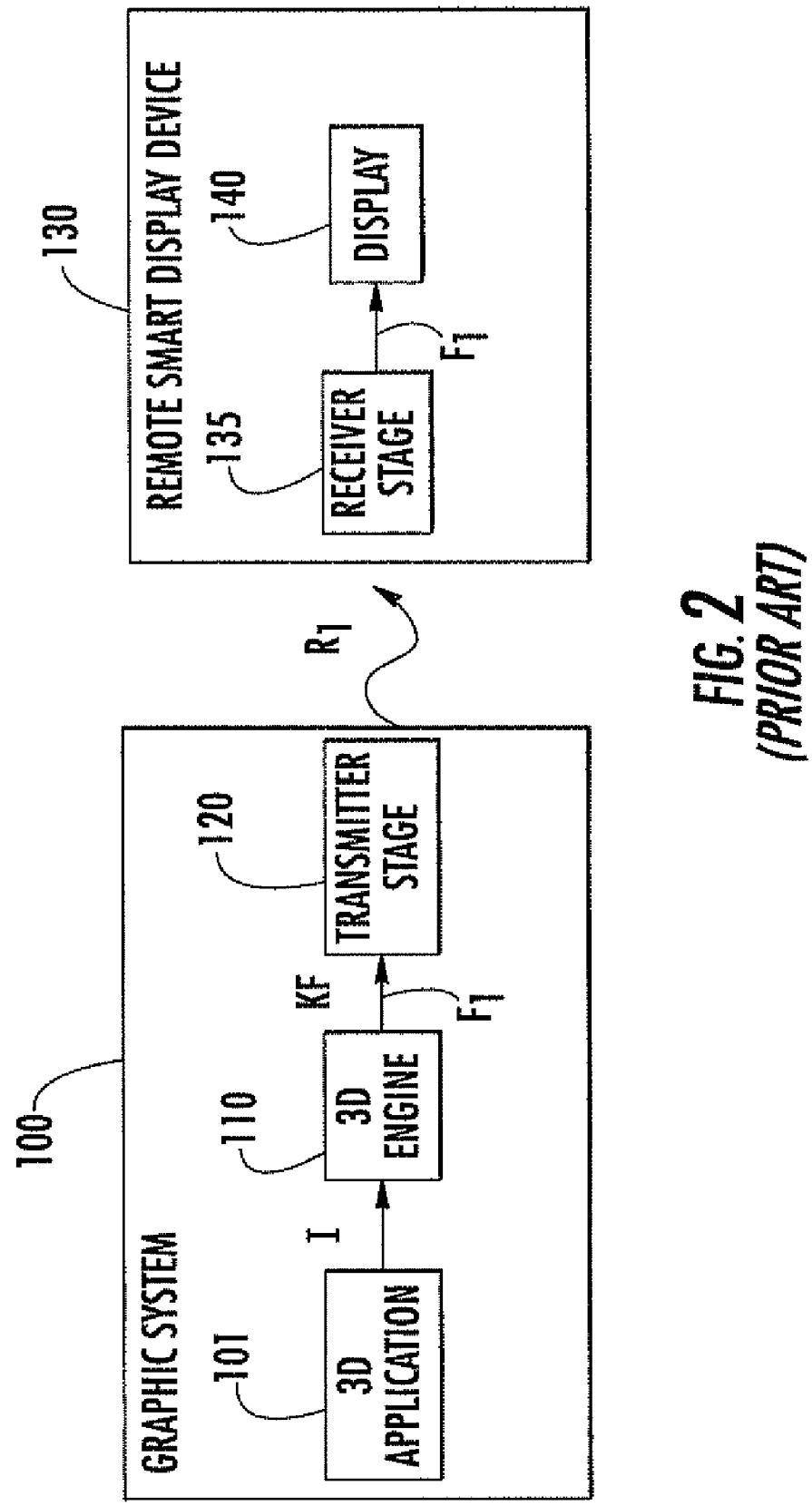

In the case of a fully rendered frame KF a triangle setup step 504A is performed, carrying out all the operations already described with reference to FIG. 1. In the case of an interpolated frame IF, the triangle setup stage 212 computes motion vectors (backward and forward) that are associated to the vertices of potentially visible triangles in the interpolated frame. The triangle-setup stage 212 computes the content of the forward motion buffer MBF and the backward buffer MBB.

Motion vectors are interpolated to associate information to pixels that form the interpolated frame IF. In general, for each pixel that is different from the interpolated frame IF background, two motion vectors are available. A first one is related to a forward frame KFF, and a second one is related to a backward frame KFB.

Such interpolated vectors are properly quantized, and stored within the motion buffers MBF and MBB. Irrespective of whether the frame is a fully rendered frame KF or an interpolated frame IF, during the triangle-setup phase a depth buffer ZB is associated to the currently computed frame to divide the pixels in two categories: background pixels and pixels belonging to at least one triangle.

Two different rendering operations follow, indicated as 505A and 505B, depending on the method used to render the frame. Specifically, if the frame is a fully rendered frame KF, in block 505A the pixel colors are computed as for a normal rendering stage. If the frame is an interpolated frame IF, in block 505B the pixel colors are computed through operations implemented in the motion compensation stage.

Assuming the availability of the depth buffer ZB, the forward motion buffer MBF and the backward motion buffer MBB, the pixel color is set to the background value if this pixel belongs to the background. Otherwise, a control is performed depending on the orientations of the two motion vectors. If both vectors are within the forward frame KFF and backward frame KFB, then pixel color is computed by using the information addressed by these motion vectors.

If only one vector falls in a valid area of a fully rendered forward frame KFF or backward frame KFB, then the pixel color is computed by using the valid information related to the fully rendered frame KF. If both motion vectors fall outside the references frames, then the following strategies can be applied: no operation is performed since there is no valid information about the color; one of the two vectors is truncated to cause it to point into the fully rendered frame KF, and then used for the next coloring phase; and both vectors are truncated and can be used to compute the pixel color.

Since the motion vectors both being invalid is an unlikely event, it is generally advisable to follow the first strategy, i.e., no operation. In a step 506 the frames KF and IF are stored in the frame buffer 238 and then displayed. Then a jump back to the motion vector synthesis operation 502 is performed to start generation of the next frame.

Additional details will now be provided on the process for computing motion vector for each vertex during the motion vector synthesis operation 502. As stated before, a 3D application defines exactly what kind of movement there is at each time instant for each object composing a scene. Motion is obtained by transforming each vertex of each primitive that composes an object composing a scene. In this way, by positioning at each instant the primitives in the scene, the exact position of the respective objects within the scene is known. Such positions are specified by (x, y, z) coordinates of transformed vertices v.

These coordinates are specified in different modes depending on the reference system used. Motion vectors are simply computed by tracing the different positions, and motion is not properly estimated but rather traced precisely and so extracted. Such a motion extraction function is performed in the geometry stage 211 of the pipeline, and is properly modified to compute the motion vectors per vertex.

For example by setting the frame interpolation index NIF=n, it will be sufficient to know and trace subsequent spatial positions of transformed vertices corresponding to the forward frame KFF and the backward frame KFB. In that time range, there will be n+2 spatial positions, n associated to n interpolated frames IF and two associated to the forward and backward frames.

Basically, (n+2) positions need to be stored for each vertex. The first position stored is the one associated to the forward frame KFF. This position is the endpoint of the motion vector associated to the forward frame KFF vertices. For the next n positions (that are related to the next n time instants "framed" by n interpolated frames IF to be generated) are the application points or start points of the motion vector.

The same applies to the backward frame KFB. Here the endpoint of the motion vector is associated to the backward frame KFB, while the start points are associated to n positions before. For example if the frame interpolation index NIF is equal to one, then three positions are stored for each vertex, related to interpolation time $t_1$, time $t_0$ related to the forward frame KFF, and time $t_2$ related to the backward frame KFB.

Figure 6:
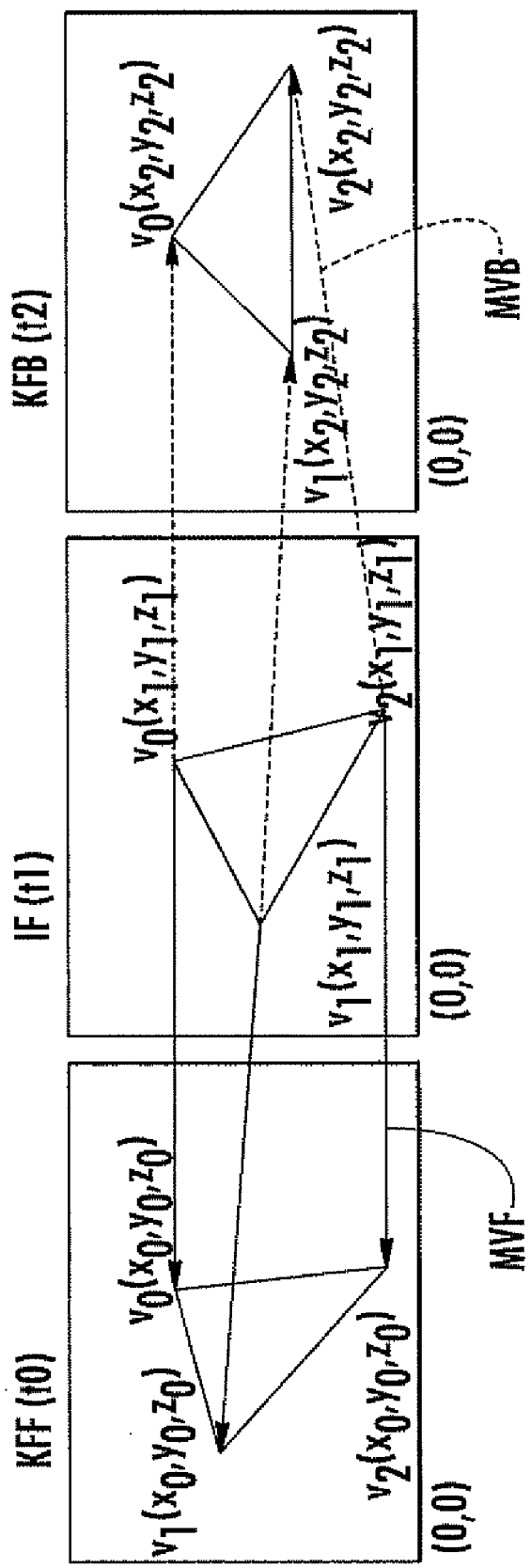
FIG. 6 represents motion vectors generated by the pipelining method according to the invention.

In FIG. 6 an example is shown, $v(x_i,y_i,z_i)$ indicates a motion vector, where the coordinates $(x_i,y_i,z_i)$ are associated to the generic vertex v at a fixed instant. This is the endpoint of the vector itself. Conversely the start point of the vector v related to i-th interpolated frame IF is the position that the vertex has at time $t_i$.

If the frame interpolation index NIF assumes values between 1 and n, then $v(x_0,y_0,z_0)$ for the generic motion vector will be always related to time instant $t_0$ to which the forward frame KFF refers. Conversely, the position $v(x_{n+1}, y_{n+1}, z_{n+1})$ of the generic motion vector will always be related to the time instant $t_{n+1}$ to which the backward frame KFB refers.

The intermediate positions $v(x_i,y_i,z_i)$ with i=1 ... n, will be the n next spatial positions that such a vertex will take, each related to a specific interpolated frame IF, of index I, to be generated. By adopting this convention and setting the index NIF to 1, then $v(x_0,y_0,z_0)$ is the notation for a generic motion vector that expresses the motion between a vertex v for the $(x_1,y_1,z_1)$ position at the time instant $t_1$, related to the only interpolated frame available IF, and the position $(x_0,y_0,z_0)$ of that vertex at the time instant $t_0$, related to the forward frame KFF. Also, $v(x_2,y_2,z_2)$ specifies a generic motion vector that synthesizes the motion between a vertex v at the position $(x_1,y_1,z_1)$ at the instant $t_1$ (again related to the interpolated frame IF) and the position $(x_2,y_2,z_2)$ at the time instant $t_2$ (again related to the backward frame KFB).

The next (n+2) transformed coordinates (x,y,z) (i.e., positions) for each visible vertex are stored in the operation 502A. The storage operation is associated to a time window extending over the n time instants covered by the interpolation process.

The interpolated frames IF are generated starting from one or more fully rendered frames KF used as references. It is thus straightforward to understand that the coordinate system adopted should be compatible with the bi-dimensional space used for the fully rendered frame KF. x, y and z are coordinates of the generic v vertex after the screen space transform.

The (n+2) coordinates $(x_i,y_i,z_i)$ with i=0 ... n+1 stored for each vertex of the scene are obtained as follows. By considering a vertex v of a scene triangle having $(x^c,y^c,z^c)$ as a set of three-dimensional coordinates specified during the execution time of the application, which is a so-called MODELVIEW operation (as well known in the context of OpenGL which moves objects as the programmer desires.

Specifically, $M_i$ indicates a 4×4 MODELVIEW matrix associated to the vertex v at the time instant i, while P indicates a 4×4 PROJECTION (OpenGL view orientation) matrix that usually is held to be constant during application execution. S indicates a matrix that implements the screen-space transform, again held to be constant since the screen resolution is fixed.

The coordinates used to store the motion vertices after (n+2) consecutive instants are designated $(x_i,y_i,z_i)$. Then the relationship between the initial coordinates $(x^c,y^c,z^c)$ of the vertex v and those coordinates $(x_i,y_i,z_i)$ that are actually stored in the vertexes is the following:

$$\begin{pmatrix} x_i \\ y_i \\ z_i \end{pmatrix} = S \cdot P \cdot M_i \cdot \begin{pmatrix} x^c \\ y^c \\ z^c \end{pmatrix}$$

with i=0 ... n+1.

The respective motion information, i.e., $(n+2)*(x_i,y_i,z_i)$, will be stored in a data structure associated to the vertex v in addition to information such as e.g., the vertex source coordinates $(x^c,y^c,z^c)$ the color (r,g,b), texture coordinates (r,g,b) (u,v), the normal (nx,ny,nz) coordinates, the blending factor, and so on.

In regards to rendering and storing the fully rendered frame KF in the rendering stage 213, it is important to underline that the frames at the output of the pipelined graphic engine are in a different order with respect to the order required for display.

Specifically, if the expected display order of frames is $f_1, f_2, f_3, \ldots, f_{n-1}, f_n$, assuming that the even frames are rendered by the motion compensation stage 237 when the index NIF is 1, the generation order will be $f_1, f_1, f_2, f_5, f_4, \ldots, f_n, f_{n-1}$, which is different from the expected presentation order.

As a consequence, to interpolate a frame IF corresponding to a frame $f_2$, fully rendered frames KF corresponding to frames $f_1$ and $f_3$ are needed, as the associated forward frame KFF and backward frame KFB. This dictates the need of temporarily storing in an ad-hoc memory space at least $f_1$ and $f_3$ by using auxiliary buffers available in the pipeline.

When interpolation takes place, the forward frame KFF and the backward frame KFB should be stored until the interpolated frame IF is completely generated. In the following additional details are provided concerning triangle-setup phase 504B associated with the motion compensation operation 505B. The forward frame KFF is displayed before the sequence including n interpolated frames IF. The backward frame KFB is displayed after the n-th interpolated frame IF, i.e., after the images of the fully rendered frames KF. The spatial position of the vertex of the 3D scene is thus well known within the temporal window including n+2 frames.

As already explained (n+2) coordinates $(x_i, y_i, z_i)$ with i = 0 . . . n+1 are stored for each visible vertex. Each set of coordinates $(x_i, y_i, z_i)$ defines the endpoint of the motion vector associated to a given frame. Specifically, the first coordinates (i=0) and the last coordinates (i=n+1) correspond to the spatial arrangement of the vertexes related to forward frame KFF and backward frame KFB.

When generating the i-th interpolated frame IF, the triangle-setup stage 212 is used to associate the vertex coordinate information at the i-th instant $(x_i, y_i, z_i)$ to each pixel of the same i frame. In the arrangement described, the triangle-setup phase 504B can be taken as a pre-processing phase for the motion information in step 505B. After being properly transformed, this will be used by the motion compensation stage 237.

The motion information stored as the vertex position $(x_i, y_i, z_i)$ at the i-th instant cannot be used directly by the motion compensation stage 237, as this performs "per-pixel" processing. Consequently, the motion information associated to each pixel should also be calculated. This is required to address fully rendered frame KF data in the motion compensation stage 237.

In this way, the exact position of each pixel (i,j) in the forward frame KFF and the backward frame KFB will be known. The input data for each triangle processed during the processing of interpolated frame IF are the following. For $v_0(x_i, y_i, z_i)$, $v_1(x_i, y_i, z_i)$ and $v_2(x_i, y_i, z_i)$; these coordinates are the vertices of a triangle to be rasterized (ordered per increasing y and x), relative to the i-th instant. For $v_0(x_0, y_0, z_0)$, $v_1(x_0, y_0, z_0)$ and $v_2(x_0, y_0, z_0)$; these coordinates are related to the positioning of the same vertex at the instant associated to the forward frame KFF. For $v_0(x_{n+1}, y_{n+1}, z_{n+1})$, $v_1(x_{n+1}, y_{n+1}, z_{n+1})$ and $v_2(x_{n+1}, y_{n+1}, z_{n+1})$; these coordinates are related to the positioning of the same vertex at the instant associated to the backward frame KFB.

During interpolation of the interpolated frame IF, the depth buffer ZB, the forward motion buffer MBF and the backward motion buffer MBB will store data related to visible triangles. In this way, two sets of useful information items are provided to compute the final color of the pixels within the interpolated frame IF in the subsequent motion compensation stage 237.

These information items are respectively stored in the depth buffer ZB, which allow those pixels related to the i-th interpolated frame IF to be divided into sets of visible pixels/objects and background pixels. The motion information is also stored in the forward motion buffer MBF and the backward motion buffer MBB.

Typically, the location (i,j) of the forward motion buffer MBF includes three coordinates $(x_0, y_0, z_0)_{i,j}$ related to the (i,j) pixel in the interpolated frame IF that point at the forward frame KFF. Similarly the location (i,j) in the backward motion buffer MBB includes $(x_{n+1}, y_{n+1}, z_{n+1})_{i,j}$ coordinates related to the (i,j) pixel in the interpolated frame IF that point at the backward frame KFB.

When a 3D application uses a perspective projection, the scan-conversion algorithm based on simple linear interpolation of motion vectors is not sufficient to address with the correct accuracy where the pixel (i,j) is located on the forward and backward frames KFF and KFB.

A modified process with a perspective correction could be adopted. To each vertex two motion vectors are associated. The first is related to the forward frame KFF and is defined by the coordinates $(x_{0l}', y_{0l}', z_{0l}')$ with l=0 . . . 2, while the coordinates $(x_{(n+1)l}', y_{(n+1)l}', z_{(n+1)l}')$ with l=0 . . . 2 specify the second vector. All of the x', y' and z' coordinates are screen-space.

To compute the forward vector $MVF_{i,j}$ the coordinates $(x_{0l}', y_{0l}', z_{0l}')$ are used that are associated to the vertex of a triangle (with l=0 . . . 2 indicating the corresponding vertex), while the coordinates $x_{(n+1)l}', y_{(n+1)l}', z_{(n+1)l}'$ are used for the backward vectors. The resulting process that uses perspective correction is a modified version of the linear process considered in the foregoing. The number of pixels per frame is fixed to (resX·resY), where resX and resY are the horizontal and the vertical resolution, respectively.

All the items of information associated to a given pixel are stored in the buffer in a group of adjacent storage locations associated to each pixel. Motion buffers store the motion vector components associated to the i-th interpolated frame IF. Each motion vector is comprised of 3 components $(x_i, y_i, z_i)$. $z_i$ is a real coordinate. $x_i$ and $y_i$ are quantized and then stored. Additionally, motion buffers store a fourth coordinate for each pixel, namely $z_{key}$.

Specifically, the z pixel coordinate that was in the depth buffer ZB during the rendering phase of the forward frame KFF is stored as $z_{key}^{pre}$ in the forward motion buffer MBF. Similarly, the z pixel coordinate that was in the depth buffer ZB during the rendering phase of the backward frame KFB is stored as $z_{key}^{post}$ in the backward motion buffer MBB.

The fourth coordinate $z_{key}$ will be exploited for the Z-test of visibility in the motion compensation stage 237 described in the following. The two motion buffers MBF and MBB have a number (resX·resY) of locations. Each location stores no more than four coordinates. Two of these are z coordinates (including m bits each), while the two other coordinates are quantized x and y motion vector components (including n bits each). The size for each motion buffer is (resX·resY)[2·m+2·n] bits.

To compute the i-th interpolated frame IF, the depth buffer information is needed to distinguish between the pixels that are in the background and the pixels that are visible. Specifically, not-in-background pixels in the depth buffer ZB are pixels belonging to visible objects in the i-th interpolated frame IF.

A motion vector can address a generic spatial location within a fully rendered frame KF. This location can be different from the (i,j) discrete position. Then the "virtual" pixel that is actually addressed (i.e., pointed to by the vector) may at least partially overlap with other pixels. Subsequently, a quantization procedure of the motion vector components is needed to cause the virtual pixel to coincide with at least one of the sub-pixel associated to each pixel.

This process, which amounts to rounding the real coordinates $(x_i, y_i)$ to the integer values $(\lfloor x_i \rfloor, \lfloor y_i \rfloor)$, suggests that the motion vector components should be preferably quantized with a sub-pixel precision. The quantization procedure of the motion vector components having a precision 1/P (with P=1, 2, 4, ..., $2^i$ where i is a positive integer) operates on a motion vector $v(x_i, y_i, z_i)$. The real coordinates in the screen-space are $x_i$, $y_i$ and $z_i$.

The index i is related to the motion buffer that is associated to the i-th interpolated frame IF. Then a quantized vector $v(x_i^q, y_i^q, z_i^q)$ is obtained from vector v, by quantizing it with 1/P pixel precision. The coordinates $(x_i^q, y_i^q, z_i^q)$ are obtained from $(x_i, y_i, z_i)$ by using the following formula:

$$\begin{cases} x_i^q = \dfrac{\lfloor x_i \cdot P + 0.5 \rfloor}{P} \\ y_i^q = \dfrac{\lfloor y_i \cdot P + 0.5 \rfloor}{P} \\ z_i^q = z_i \end{cases}$$

Thus, the quantization moves the vector to a sub-pixel position. If P=1 then the net effect achieved is rounding the $(x_i, y_i)$ components to the nearest integers. This is the case when the motion vector points to the nearest pixel in the screen grid without sub-pixel decomposition.

With P=2 (half-pixel precision) this operation moves to the center of the pixel to one of adjacent nine sub-pixels in the sub-grid associated with half-pixel definition. With P=4 (quarter-of-pixel precision) up to 25 sub-pixel positions in a respective sub-grid are available to reposition the motion vector. In general, if the quantization uses 1/P pixel precision, then $(P+1)^2$ sub-pixels are available for repositioning. Selecting P=2 appears to represent a reasonable compromise for most practical applications.

In the following, additional details will be provided concerning the procedure for computing the color of each pixel in the i-th interpolated frame IF as performed in the motocompensation operation 505B. To each pixel a 4-integer value (R,G,B,A) is associated.

In general, the process for computing the color generates a final pixel color $(R,G,B,A)_{out}$, starting from n pixels, each one made of values $(R,G,B,A)_i$. To each of these pixel values n weighting coefficients $w_i$ are associated, where:

$$0 \leq w_i \leq 1 \; \forall i = 1 \ldots n$$

Thus, the final color is:

$$(R, G, B, A)_{out} = \sum_{i=1}^{n} [w_i \cdot (R, G, B, A)_i]$$

The motion compensation stage 237 performs a general process for computing colors having as its inputs i) two frames KF (forward frame KFF and backward frame KFB) already rendered by the rendering stage 213, to be used as references; ii) motion buffer information MB related to the forward and backward frames KFF and KFB, including for each pixel of the i-th interpolated frame IF the coordinates $(x_1, y_i, z_i, z^{Zbuffer})$ where $x_i$, $y_i$ and $z_i$ are the motion vector's screen coordinates computed at the triangle setup phase 504B and $z^{Zbuffer}$ is the buffer ZB pixel value associated to the key frame; and iii) the buffer information $ZB_i$ related to the i-th interpolated frame IF under generation.

If a pixel (i,j) is not in the background, a check operation is performed to test if the motion vectors are valid or not. A motion vector is valid when its quantized coordinates x and y address an internal location of a related, fully rendered frame KF. Practically, a motion vector is considered valid if:

$$0 \leq x \leq resX - 1$$

$$0 \leq y \leq resY - 1$$

After such operation if both motion vectors for the pixel (i,j) are valid, the final color is computed using four pixels that overlap the quantized position addressed on the forward frame KFF. The same applies to the backward frame KFB. A total of 8 pixels are used with weighting factors $w_i$ con i= 1 ... 8. If only one motion vector is valid, this is used to compute the color of the pixel. Only 4 pixels and weighting factors are needed, related to a fully rendered frame KF. If both motion vectors are invalid (a rare occurrence) different strategies can be used, i.e.: no action is taken; the pixel is the same as the background; both vectors are made valid by suitable truncation, thus going back to the first case; only one vector is made valid by truncation and then the second case is applied; and the image borders are extended by simple replication of the first/last row/column to cover the space region that make valid the motion vectors. As a result the extension encloses the vector.

Finding correct values for the weights $w_i$ is important since this has an impact on the final quality. The general scheme is able to compute eight weight coefficients $w_i$ if both motion vectors are valid or if only one is valid and uses four coefficients.

A procedure to compute the interpolated frame IF using motion compensation information is the following. It uses two motion vectors per pixel from the forward motion buffer MBF, $(x^{pre}, y^{pre}, z^{pre}, z^{ZbufferPre})$ associated to the forward frame KFF, and from the backward motion buffer MBB, $(x^{post}, y^{post}, z^{post}, z^{ZbufferPost})$ associated to the backward frame KFB. The quantization precision factor P is preferably set to 2.

Two different criteria to find the weight $w_i$ may be adopted. Assuming that weights $w_1, w_2, w_3, w_4$ are associated to four pixels addressed by the motion vector on the forward frame KFF, while weights $w_5, w_6, w_7, w_8$ are associated to four pixels related to the backward frame KFB, the motion vector related to forward frame KFF is considered and the first four weights $w_i$, with i=1 ... 4, are computed on the basis of parameters $ca_i$ and $cb_i$ which are computed using criteria A or B, as detailed in the following.

By definition $w_i = ca_i \cdot cb_i$. The parameters $ca$, $cb_i$ are computed starting from $(x_{pre}, y^{pre}, z^{pre}, z^{ZbufferPre})$ of a valid motion vector. The criteria referred to in the foregoing are as follows.

For criteria A, if P=2, then each quantized motion vector has $x^{pre}$ and $y^{pre}$ coordinates with decimal portions having values 0 or 0.5. This implies that a quantized pixel can overlap only one of 1, 2 or 4 pixels in the pixel grid of a fully rendered frame KF.

The number of overlapped pixels influence how $ca_i$ (with i=1 ... 4) is computed:

$$ca_i = \frac{test_i}{NPS}$$

where NPS indicates the number of pixels overlapped to the quantized motion vector position. $test_i$ is a test variable that can be 0 or 1, if the i-th pixel is (partially) overlapped to "quantized" pixel ($test_i=1$) or not ($test_i=0$).

For criteria B, criteria B uses $z^{pre}$ and $z^{ZbufferPre}$ to run a visibility test, while in criteria A only the $x^{pre}$ and $y^{pre}$ components are used from each motion vector. The motion vector coordinates $x^{pre}$ and $y^{pre}$ address pixels on the forward frame KFF. This may overlap with four pixels of the forward frame KFF.

This criteria compares $z^{pre}$ coordinate of the motion vector with each $z_i^{ZbufferPre}$, with i=1 ... 4 pixels overlapped. If the difference is very low, then a substantial likelihood exists that any overlapped pixel would be very close to the current pixel to be colored in the interpolated frame IF. Otherwise if the difference in the z coordinate is high, the pixels are highly likely to belong to different objects. Pixel color information is not useful and the related weighting factor should be very low.

Then $cb_i$ is defined as follows: $\Delta z_i = |z^{pre} - z_i^{ZbufferPre}|$, where i=1 ... 4 indicates which 4 overlapped pixels are addressed. If $\Delta z_i > S$ then $cb_i=0$, otherwise if $\Delta z_i \leq S$ then $cb_i=1$. A forward or backward motion compensation with no Z-test is also possible, thus introducing further simplifications in comparison with the techniques considered before.

For weights $w_i$ with i=1 ... 8, criteria A is the only one used. Criteria B is not applied. Since the z coordinate information is not used, motion vectors MVF and MVB are specified as quantized values ($x^{pre}, y^{pre}$) and ($x^{post}, y^{post}$)

Finally, a forward-only motion compensation procedure can be used. Such procedure uses a single, fully rendered frame KF (e.g., the forward frame KFF), and a single motion vector per pixel to determine the spatial location of that pixel in the forward frame KFF. Since the backward frame KFB is no longer needed, the related memory is free and the processing order is the same as the visualization order on the display side.

The temporal window in this case includes (n+1) frames. In the place of tracing (n+2) consecutive vertex positions only (n+1) such positions are needed (where n is the frame interpolation index NIF). In this case, triangle setup phase 504B generates only one motion buffer and is related to the fully rendered frame KF before n interpolated frames IF. The motion compensation stage uses only one motion vector for each pixel in the interpolated frame IF.

The criteria used for the bi-directional motion compensation procedure can be used in this case as well. If the motion vector is not valid, since e.g., a given detail is not on the fully rendered frame KF, the motion vector must be made valid by truncating the (x,y) components. Another approach is to extend the fully rendered frame KF up to the location addressed by the motion vector. The weights $w_i$ are not as limiting as example four and are computed as previously explained. The arrangements disclosed herein lead to significant advantages over previously known approaches.

The proposed graphic system and pipelining method generate motion vectors without the need for any motion estimation algorithm and the corresponding hardware resources. Also, the motion compensation stage advantageously uses information in the motion buffer where 4 dimensional information guides the process. Interpolated pictures which are fully rendered are then re-ordered and sent to a display in the right temporal order.

When a remote smart display is used, the motion compensation stage is placed within it and uses motion information that are transmitted by the modified and proposed graphic engines. Motion information and fully rendered frames are also compressed by the graphic engine and received (via wireless or wired channel) by the smart display, then decoded and sent to the motion compensation stage.

Additionally, the graphic system disclosed herein is adapted for use within the framework of a very simple video encoder originating a very short processing delay, in particular, when compared to state-of-the-art MPEG2/4 or JPEG encoders.

Operation of the 3D engine at a reduced frame rate leads to a reduction in terms of power consumption, since this depends linearly on the difference between full and reduced frame rates. It is therefore evident that without prejudice to the underlying principle of the invention, the details and embodiment may vary, also significantly, with respect to what has been disclosed just by way of example without departing from the scope of the invention, and defined by the claims that follow.

Referring now to FIGS. 7 to 18, a preferred approach for improving the quality of the images will now be discussed. In motion compensation as discussed above, the intermediate frame constructed with a linear interpolation starting from motion vectors may in fact yield incorrect pixel colors within triangles.

In fact, the embodiment previously described builds odd frames starting from the previous and next even frames and extracts motion vectors of triangles vertices (e.g., left portion of FIG. 6). The next step is the rasterization of motion vectors of pixels within the triangles. A further step is the combination of filtered pixels coming from the previous and next even frame (e.g., center portion of FIG. 6). Finally, the sequencer sorts odd and even frames into the correct order.

The perspective view causes nonlinear relationships between old and new triangles. This phenomenon can be countered by using a simple alpha perspective correction, which however may turn out to be insufficient to fully compensate non-linearity effects.

As opposed thereto, the preferred arrangement of FIGS. 7 to 18 uses a double perspective correction to produce an improved quality image, which may not be attainable using a simple perspective correction. Without such double perspective correction, images may turn out to be unfocused within triangles and pixels may seem to freeze during time evolution. Double perspective correction provides increased image quality with focused images and without freezing effects.

Figure 7:
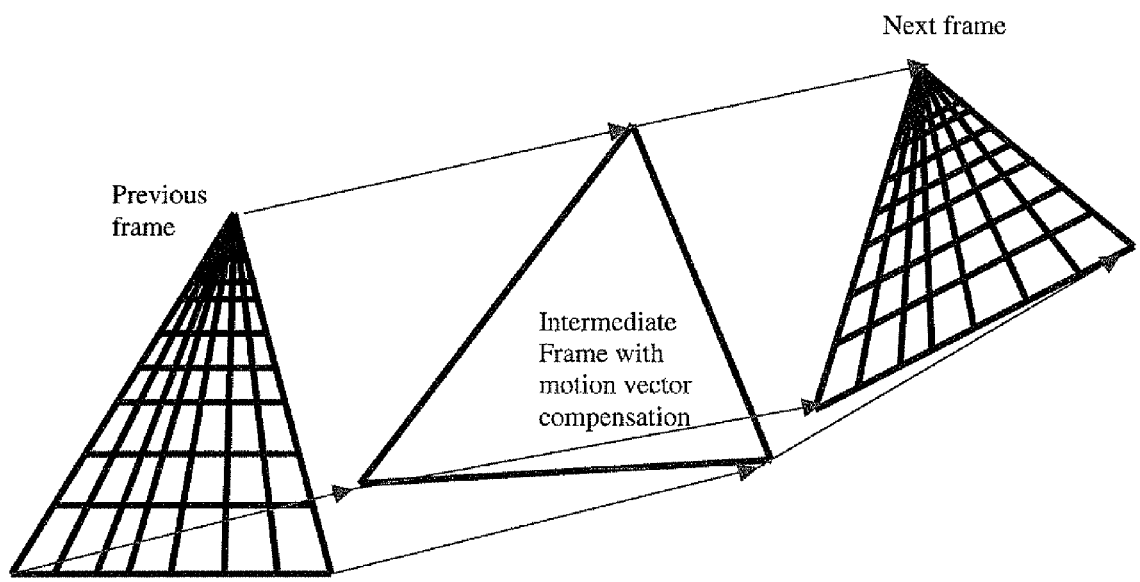
FIG. 7 is representative of a previous frame, an intermediate frame and a next frame according to the invention.
Figure 8:
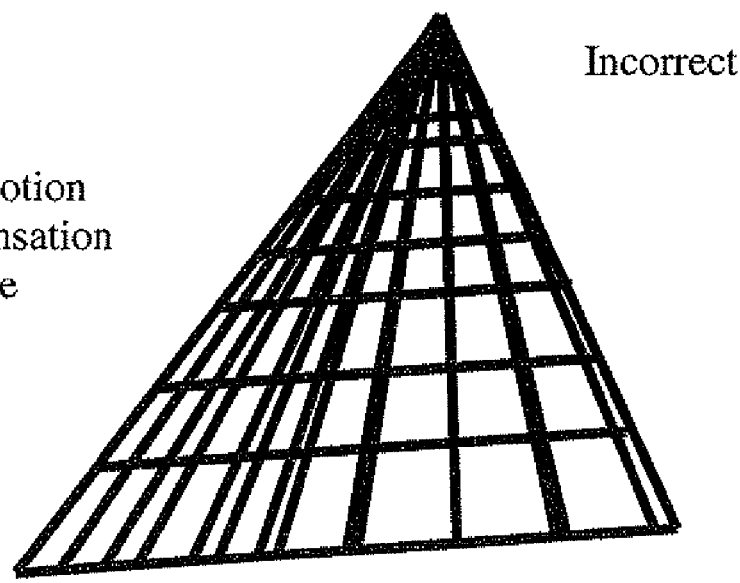
FIG. 8 is representative of the intermediate frame shown in FIG. 7 without a double perspective correction.

FIG. 7 is representative of a triangle with a colored (e.g., blue) texture grid. The intermediate triangle is constructed correctly from the vertices with motion vector compensation. However, after motion vector interpolation without a double perspective correction of internal pixels, the result may be an unfocused image as schematically shown in FIG. 8.

Figure 9:
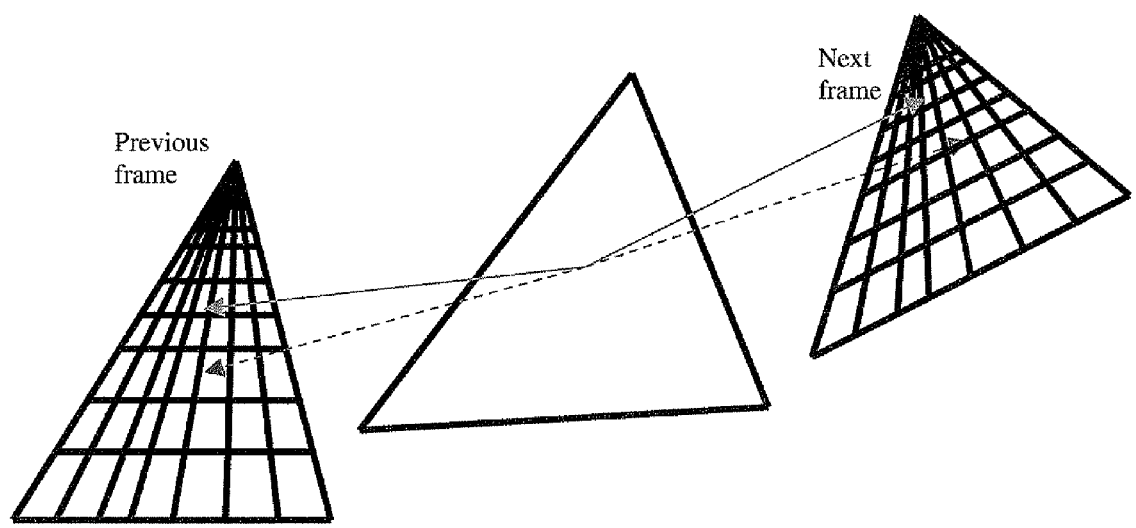
FIG. 9 shows the correct and incorrect motion vector of an internal pixel in an intermediate frame based on the previous and next frames according to the invention.

FIG. 9 shows the correct and incorrect motion vector of an internal pixel in the case when the center point of the intermediate frame does not coincide with the center points of the previous and next frames because the perspective view is enabled.

Figure 10:
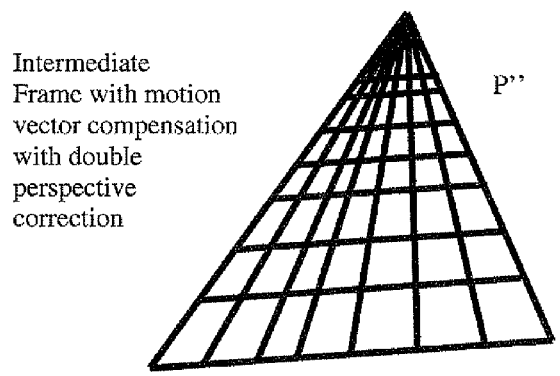
FIG. 10 is representative of the intermediate frame shown in FIG. 9 with a double perspective correction.
Figure 11:
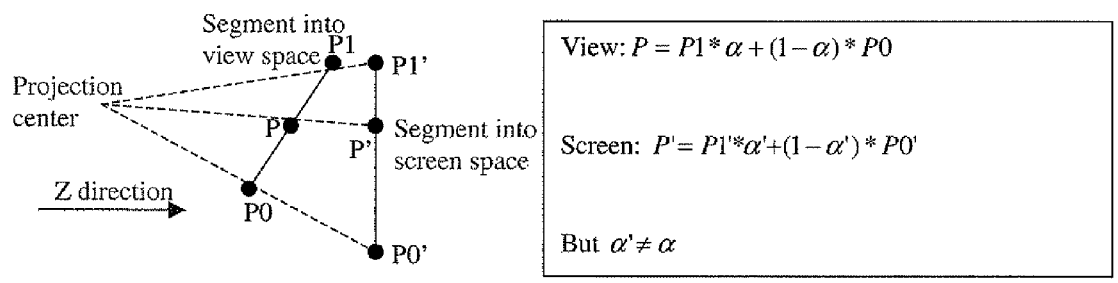
FIG. 11 illustrates calculation of the double perspective correction according to the invention.

FIG. 10 shows the result after motion vector interpolation if double perspective correction of internal pixels is effected. The result is in any case a focused image. FIG. 11 specifically shows how the double correction is calculated, as follows:

I) View Side:

$$P = P1 * \alpha + (1-\alpha) * P0$$

where the view vector P is defined in x, y and z view coordinates in the equivalent manner:

$$\alpha = \frac{(x - X0)}{(X1 - X0)}$$

-continued $$\alpha = \frac{(y - Y0)}{(Y1 - Y0)}$$

$$\alpha = \frac{(z - Z0)}{(Z1 - Z0)}$$

II) Screen Side:

$$P' = P1'*\alpha' + (1-\alpha')*P0'$$

where the screen vector P' is defined in x', y' and z' screen coordinates in the equivalent manner:

$$\alpha' = \frac{(x' - X0')}{(X1' - X0')}$$

$$\alpha' = \frac{(y' - Y0')}{(Y1' - Y0')}$$

$$\alpha' = \frac{(z' - Z0')}{(Z1' - Z0')}$$

The relationship between P and P' is defined by the projection matrix:

$$x' = \frac{ax}{z} + b$$

$$y' = \frac{cx}{z} + d$$

$$z' = \frac{e}{z} + f$$

Hence:

$$\alpha' = \frac{Z1}{Z1 + \left(\frac{1}{\alpha} - 1\right)*Z2}$$

where Z is the depth.

The transformations in the view space do not change the view alpha ($\alpha$): after a translation and rotation, a center point in the view space is still a center point. Conversely, transformations in the screen space do change the screen alpha ($\alpha'$) after a translation and rotation a center point in the screen space is no longer a center point.

The first time the triangle is in the previous even frame; the relationship between the view triangle and the screen triangle is valid. Then a transformation is applied to yield the odd frame. The view alpha ($\alpha$) is the same, but the screen alpha ($\alpha''$) is different from $\alpha'$.

Figure 12:
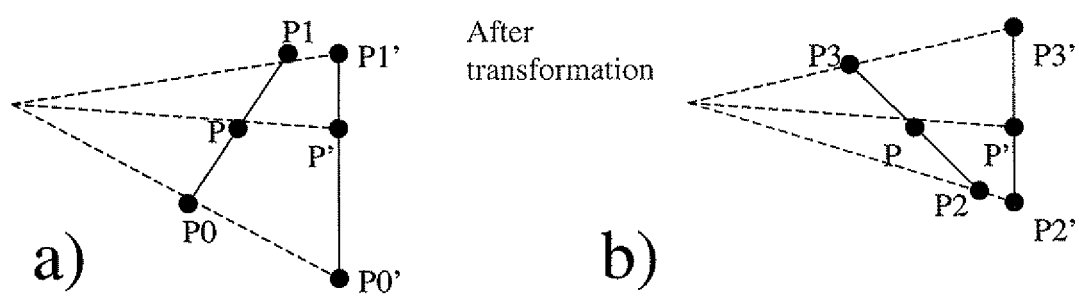
FIG. 12 illustrates a triangle before a) and after b) a transformation according to the invention.

FIG. 12 includes two portions, designated a) and b), which are representative of the situation before (a) and after (b) the transformation.

$$P = P1*\alpha + (1-\alpha)*P0$$

$$P' = P1'*\alpha' + (1-\alpha)*P0'$$

and $$P = P3*\alpha(1+\alpha)*P2$$

$$P'' = P3'*\alpha'' + (1-\alpha'')*P2'$$

where the screen vector P" is defined in x", y" and z" screen coordinates in the equivalent manner:

$$\alpha'' = \frac{(x'' - X2')}{(X3' - X2')}$$

$$\alpha'' = \frac{(y'' - Y2')}{(Y3' - Y2')}$$

$$\alpha'' = \frac{(z'' - Z2')}{(Z3' - Z2')}$$

As indicated, the screen alpha $\alpha''$ is different from $\alpha'$. However, both $\alpha'$ and $\alpha''$ are a function of $\alpha$—via the respective depths Z, e.g.:

$$\alpha' = \frac{Z1}{Z1 + \left(\frac{1}{\alpha} - 1\right)*Z2}$$

so that one may establish a relationship between $\alpha'$ and $\alpha''$.

Hence, the double perspective correction can be expressed as follows:

$$\alpha'' = \frac{Z3*Z0*\alpha'}{Z3*Z0*\alpha' + (1-\alpha')*Z1*Z2}$$

This relationship makes it possible to find the right pixel positions in the previous even frame starting from the pixel positions in the odd frame, i.e., to calculate x", y" and z" starting from x', y' and z'. The formula above thus translates in the following relationships:

$$\frac{(x'' - X2')}{(X3' - X2')} = \frac{(Z1' - f)*(Z2' - f)*(x' - X0')}{(Z1' - f)*(Z2' - f)*(x' - X0') + (Z3' - f)*(Z0' - f)*(X1' - x')}$$

$$\frac{(y'' - Y2')}{(Y3' - Y2')} = \frac{(Z1' - f)*(Z2' - f)*(y' - Y0')}{(Z1' - f)*(Z2' - f)*(y' - Y0') + (Z3' - f)*(Z0' - f)*(Y1' - y')}$$

$$\frac{(z'' - Z2')}{(Z3' - Z2')} = \frac{(Z1' - f)*(Z2' - f)*(z' - Z0')}{(Z1' - f)*(Z2' - f)*(z' - Z0') + (Z3' - f)*(Z0' - f)*(Z1' - z')}$$

The same applies to determining the right pixel positions in the next even frame from the pixel positions in the odd frame.

Figure 13:
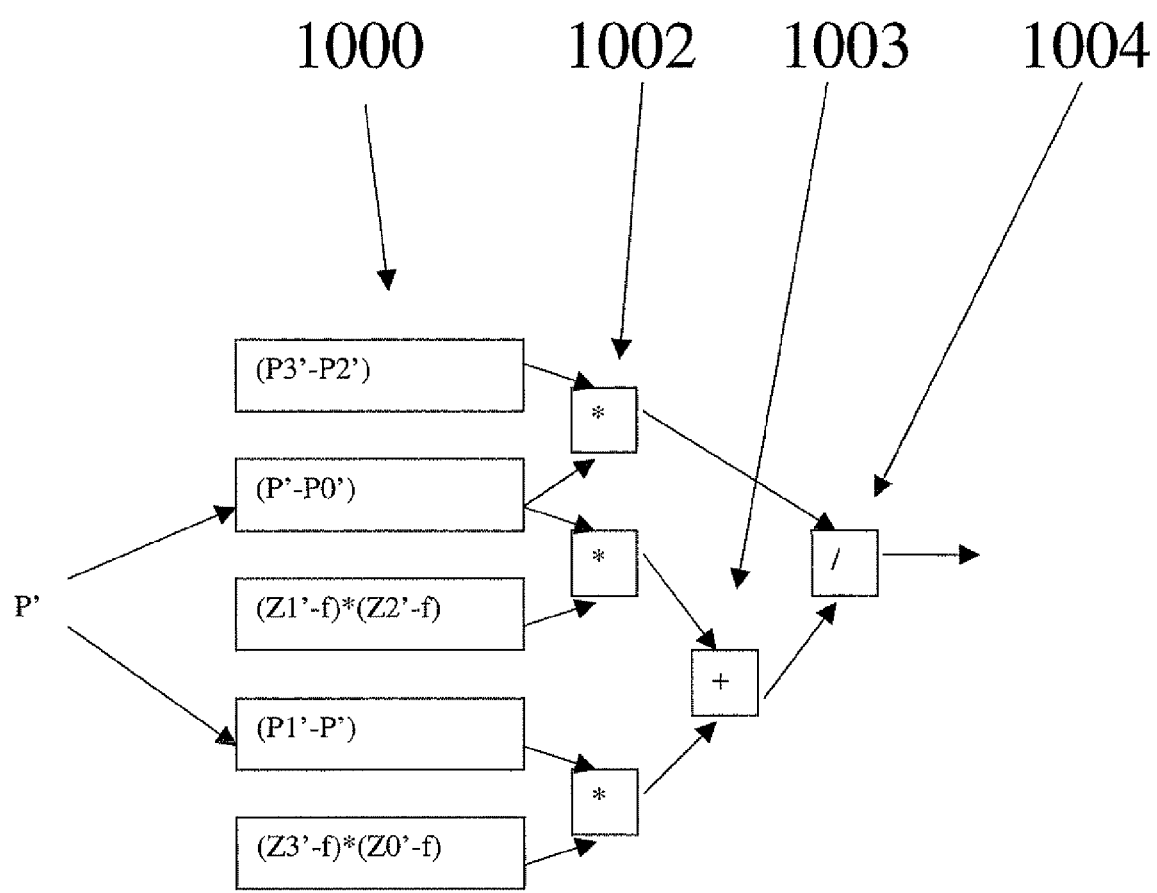
FIG. 13 is a block diagram of a double perspective correction module according to the invention.

FIG. 13 is an exemplary block diagram of a hardware implementation of the double perspective correction discussed above. In the block diagram of FIG. 13, P' and P" are generally representative of the input and output vectors, respectively. The blocks collectively indicated as 1000 are representative of the calculations indicated therein, while the references 1002, 1003, and 1004 are representative of multiplier (*), adder (+), and divider (/) stages acting on the input data and producing output data according to the data flows indicated by the arrows shown in the drawing.

Figure 14:
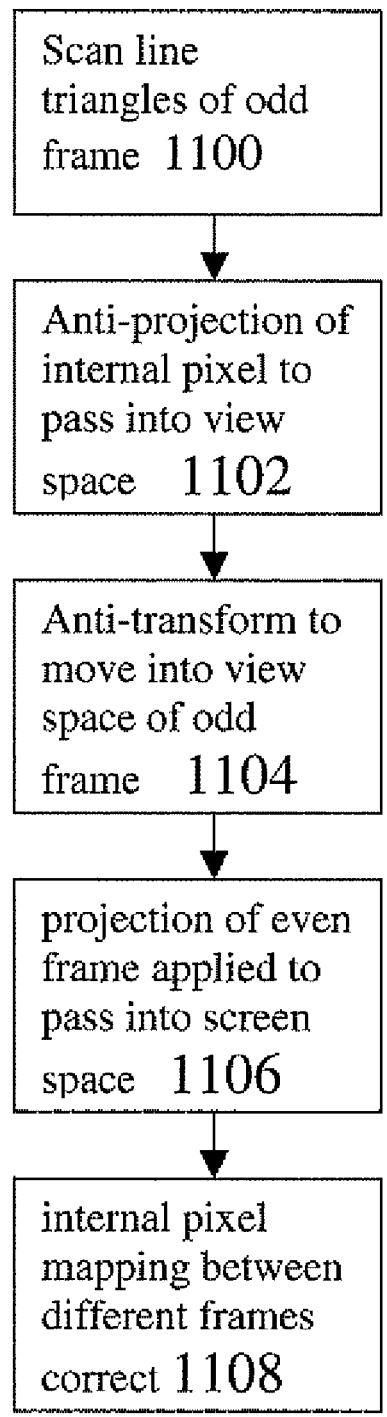
FIG. 14 a flow chart for performing the double perspective correction according to the invention.

FIG. 14 is a flow chart representative of the corresponding processing steps. In brief, the motion vectors coming from the triangle of screen space of the odd frame are anti-projected, so that the motion vectors are now in the view space.

Again, transformations in the view space do not change the view alpha ($\alpha$) since after a translation and rotation a center point in the view space is still a center point. After transform the motion compensation keeps the same proportionality between spatial coordinates. Finally, the motion vectors are projected into the even frame.

Specifically, in a step 1100 the triangles of the previous odd frame are (line) scanned. In a step 1102 the internal pixels of the odd frame are anti-projected to pass into the view space. In a step 1104 an anti-transform is performed to move from odd to even frame in the internal pixel view space of the odd frame.

In a step 1106 the projection of even frame is applied on the internal pixels to pass (back) into the screen space, so that correct internal pixel mapping between triangles of different frames is obtained in a step 1008.

The same correction can be applied by changing space. For instance, in the place of screen coordinates homogeneous or common coordinates can be used. In this space the relationships between triangles are linear as they are in the view space. This approach thus involves storing common vertex coordinates and then applying linear interpolation of motion vectors to find internal pixels. Finally, it is necessary to move from common space coordinates into screen coordinates by a division by W.

The common coordinates are in the form:

$$Ph'=Ph1'*\alpha'+(1-\alpha')*Ph0'$$

where the screen vector P' is defined in x', y', z' and w' common coordinates in the equivalent manner:

$$\alpha' = \frac{(x'-X2')}{(X3'-X2')}$$

$$\alpha' = \frac{(y'-Y2')}{(Y3'-Y2')}$$

$$\alpha' = \frac{(z'-Z2')}{(Z3'-Z2')}$$

$$\alpha' = \frac{(w'-W2')}{(W3'-W2')}$$

and $$Ph''=Ph3'''*\alpha''+(1-\alpha'')*Ph2'$$

Here, the screen vector P''' is defined in x'', y'', z'' and w''' common coordinates in the equivalent manner:

$$\alpha'' = \frac{(x''-X2')}{(X3'-X2')}$$

$$\alpha'' = \frac{(y''-Y2')}{(Y3'-Y2')}$$

$$\alpha'' = \frac{(z''-Z2')}{(Z3'-Z2')}$$

$$\alpha'' = \frac{(w''-W2')}{(W3'-W2')}$$

In this Case $\alpha''=\alpha'$, so that the Double perspective correction to find the relationship between common P' and P''' is the following:

$$\frac{(x''-X2')}{(X3'-X2')} = \frac{(x'-X0')}{(X1'-X0')}$$

$$\frac{(y''-Y2')}{(Y3'-Y2')} = \frac{(y'-Y0')}{(Y1'-Y0')}$$

$$\frac{(z''-Z2')}{(Z3'-Z2')} = \frac{(z'-Z0')}{(Z1'-Z0')}$$

-continued $$\frac{(w''-W2')}{(W3'-W2')} = \frac{(w'-W0')}{(W1'-W0')}$$

Finally, P''' is divided by w''' to obtain the screen coordinates. The same criteria apply to obtaining the right pixel positions of the next even frame starting from the common pixel positions of the odd frame.

Figure 15:
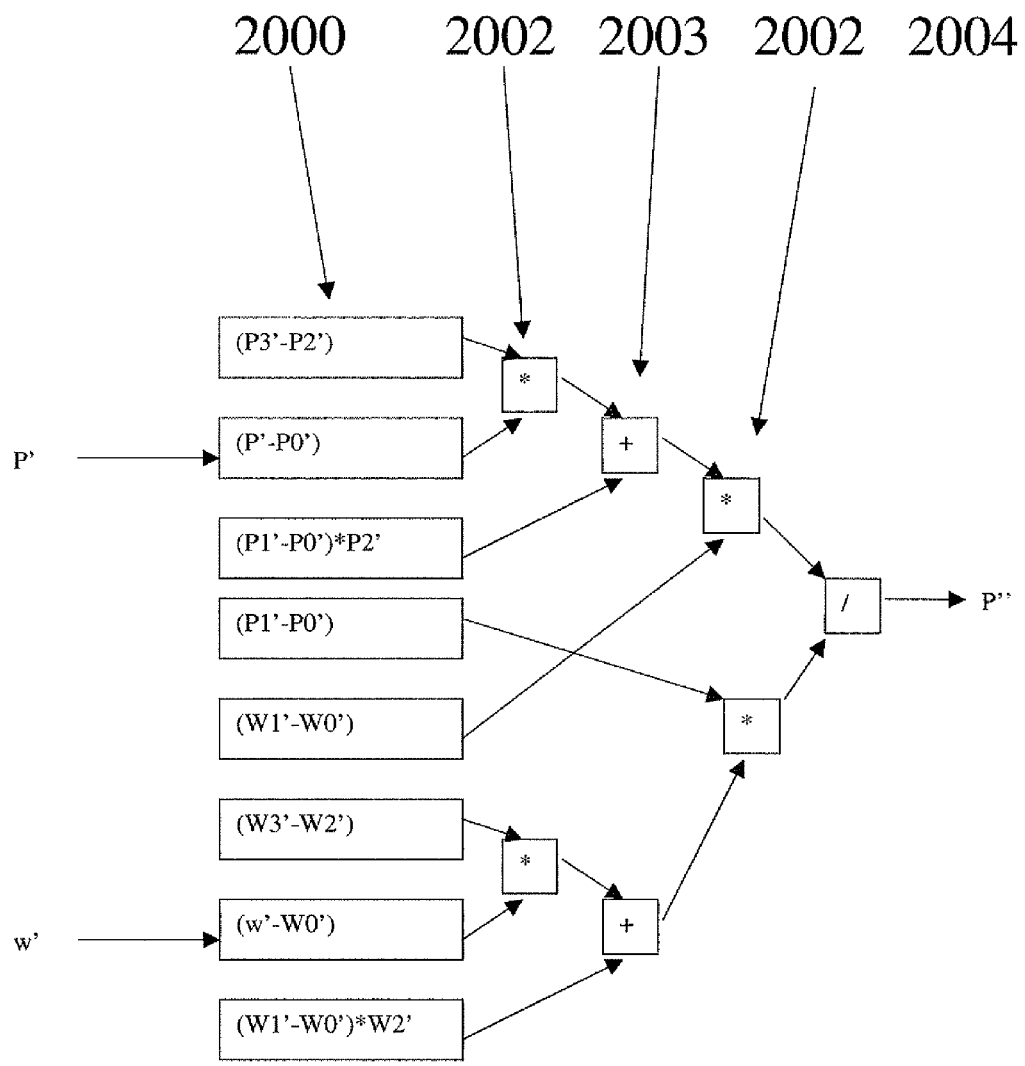
FIG. 15 is a block diagram of another embodiment of the double perspective correction module according to the invention.

FIG. 15 is an exemplary block diagram of a hardware implementation of the double perspective correction with division by w''' discussed in the foregoing. In the block diagram of FIG. 15, P' and P''' are again representative of the input and output vectors, respectively.

The blocks collectively indicated as 2000 are representative of the calculations indicated therein, while the references 2002, 2003, and 2004 are again representative of multiplier (*), adder (+), and divider (/) stages acting on the input data and producing output data according to the data flows indicated by the arrows shown in the drawing.

A main advantage of the "common" approach just described lies in the matrix projection independence. It will be appreciated that the processing described does not change if the projection is orthogonal or any other type of projection.

Figure 16:
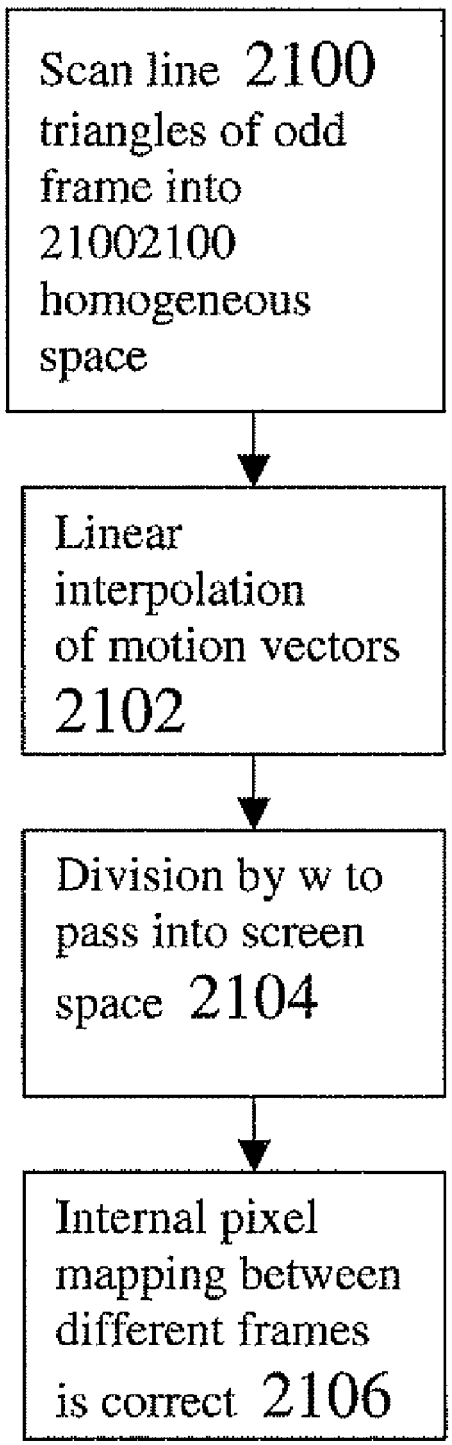
FIG. 16 a flow chart of another embodiment for performing the double perspective correction according to the invention.

FIG. 16 is a flow chart representative of the corresponding processing steps. Briefly, the common motion vectors coming from the triangle of screen space of the odd frame are linearly interpolated. As shown previously, transformations in a common space do not change proportionality since after a translation and rotation a center point in the common space is still a center point. After the transform, motion compensation maintains the same proportionality between spatial coordinates, so that the motion vectors are divided by the respective w to move into the screen space. The correct internal pixel mapping between triangles of different frames is thus achieved.

Specifically, in a step 2100 the line triangles of the odd frame are scanned in a step 2100. The linear interpolation of motion vectors to have the common positions of the triangles of the even frame takes place in a step 2102. In a step 2104 the division by w takes place to move (back) into the screen space. The correct internal pixel mapping between triangles of different frames is thus achieved in a step 2106.

Figure 17:
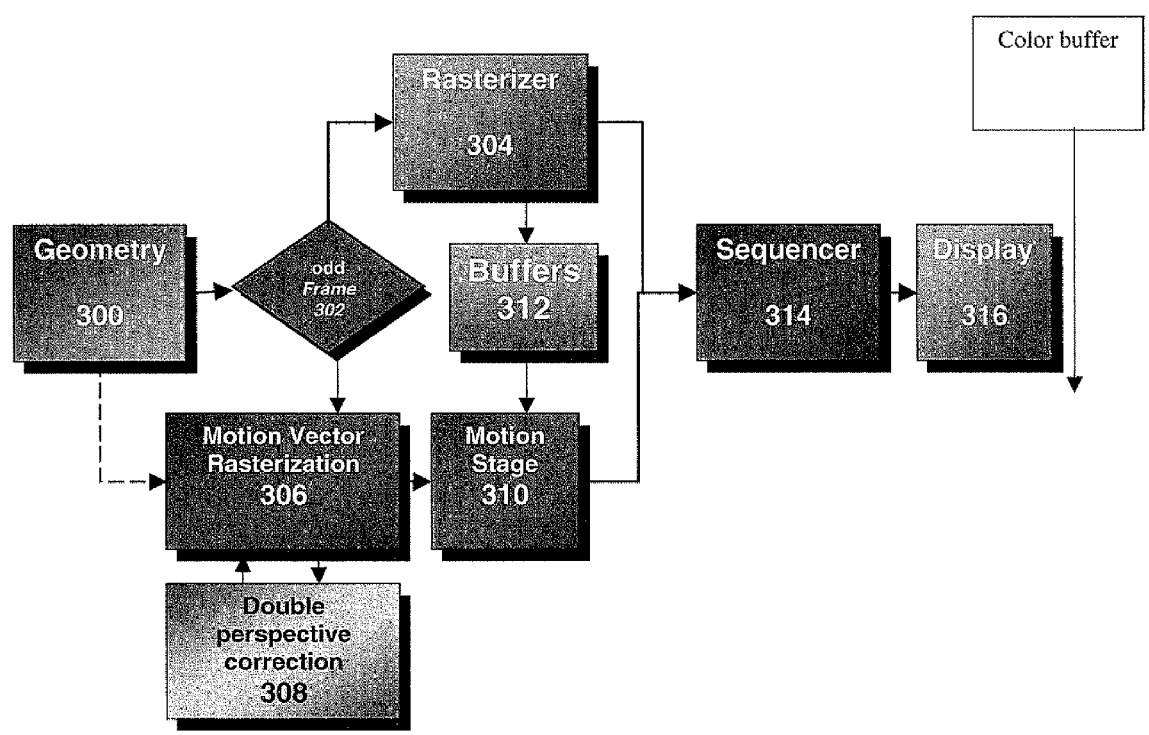
FIG. 17 is a block diagram of an arrangement incorporating a double perspective correction scheme according to the invention.

FIG. 17 is schematic block diagram of an arrangement incorporating a double perspective correction scheme as just described. In FIG. 17, the reference 300 denotes a geometry stage whose output is fed to an odd frame detector 302 to be routed either towards a rasterizer stage 304 or a motion vector rasterization stage 306. As shown in dashed lines, the output from the geometry stage can be fed directly to the motion vector rasterization stage 306.

The motion vector rasterization stage 306 co-operates with a double perspective correction stage 308 that implements any of the correction procedures described in the foregoing. The (corrected) output from the vector rasterization stage 306 is fed to a motion stage 310 that also receives rasterized data produced in the rasterizer stage 304 and buffered in one or more buffer blocks. A sequencer 314 receives and properly re-orders information received from the rasterizer stage 304 and the motion stage 310 for display on a display unit 316.

Figure 18:
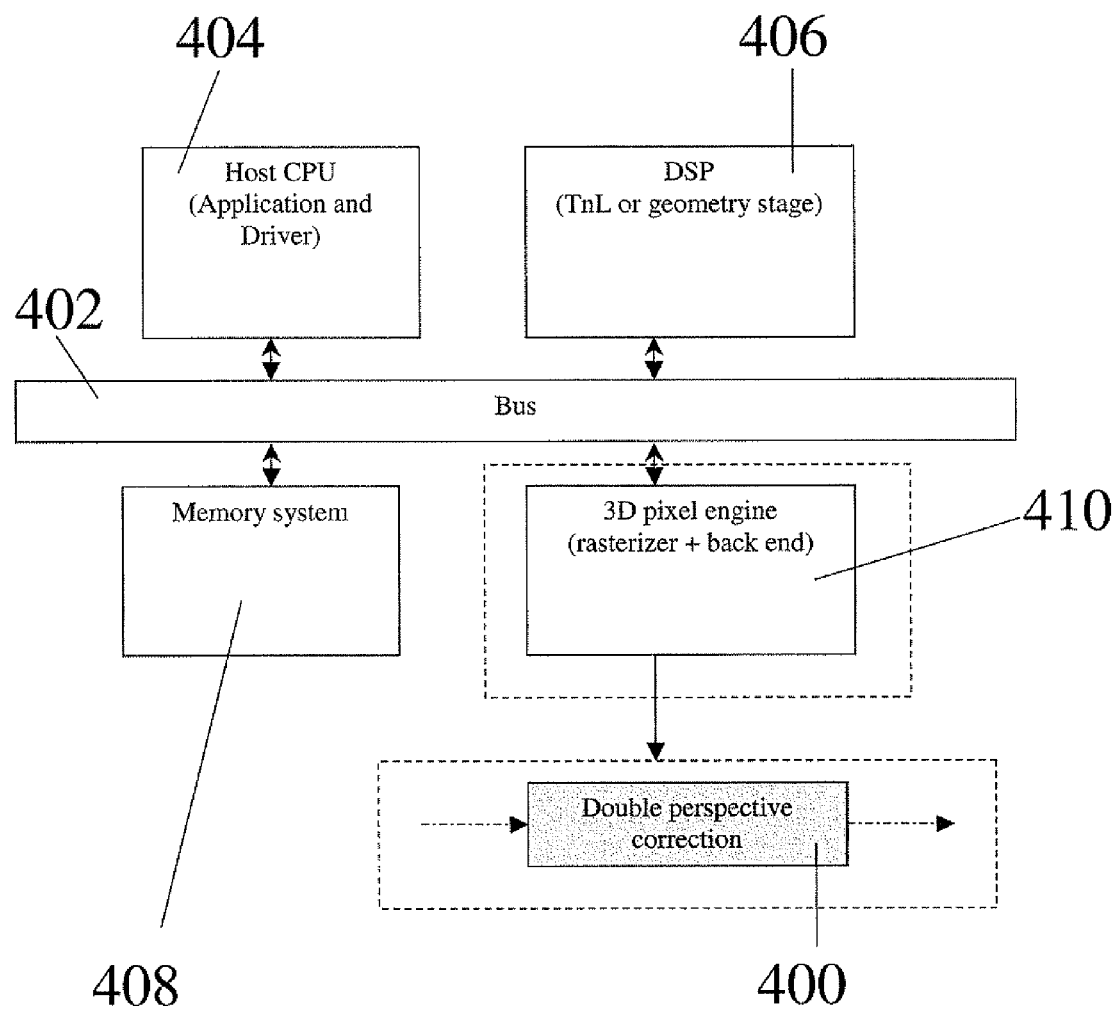
FIG. 18 is a block diagram of a double perspective correction module integrated in a HW accelerated 3D engine system according to the invention.

The arrangement described herein is adapted to operate efficiently on any 3D HW accelerated Graphics Pipeline, so-called Nomadik Platform representing a presently preferred option. FIG. 18 shows how a double perspective correction module 400 as described herein can be integrated in a HW accelerated 3D engine system supported by a bus 402 and including a host CPU 404 (application and driver), a dedicated signal processor (TnL or geometry stage), a memory system 408, as well as a 3D pixel engine 410 (rasterizer and back end) including or interfacing with the double perspective correction module 400.

That which is claimed is:

1. A graphic system comprising:
    a pipelined graphic engine for generating image frames for display, said pipelined graphic engine comprising
        at least one geometric processing stage for performing motion extraction, and
        a rendering stage for generating full image frames at a first frame rate for display at a second frame rate, the second frame rate being higher than the first frame rate;
    a motion encoder stage for receiving motion information from said at least one geometric processing stage, and for producing an interpolated frame signal representative of interpolated frames;
    a motion compensation stage for receiving the interpolated frame signal from said motion encoder stage, and the full image frames from said rendering stage for generating the interpolated frames;
    a video decoder stage for receiving the full image frames for display at the second frame rate;
    a frame buffer for receiving the full image frames from said video decoder stage, and for providing the full image frames to said motion compensation stage; and
    a multiplexer downstream from said frame buffer and from said motion compensation stage for selecting a display order for the full image frames and the interpolated frames.

2. A graphic system of claim 1, further comprising a motion decoder stage upstream from said motion compensation stage.

3. A graphic system of claim 1, wherein said at least one geometric processing stage comprises a geometry stage, and a triangle setup stage connected to an output of said geometry stage.

4. A graphic system of claim 1, further comprising a video encoder stage downstream from said rendering stage for generating a compressed bitstream.

5. A graphic system of claim 4, further comprising a first transmitter downstream from said video encoder stage; and a second transmitter downstream from said motion encoder stage.

6. A graphic system of claim 1, wherein said motion compensation stage is part of a display unit for displaying the full image frames at the second frame rate; and wherein said rendering stage and said motion encoder stage are integrated as a self-contained device with the display unit.

7. A graphic system of claim 1, further comprising a perspective correction stage for performing a perspective correction so that said motion encoder stage produces the interpolated frame signal representative of interpolated frames.

8. A graphic system of claim 1, further comprising a perspective correction stage for performing a double perspective correction so that said motion encoder stage produces the interpolated frame signal representative of interpolated frames.

9. A graphic system of claim 8, wherein said perspective correction stage is configured for performing the following:
    obtaining motion vectors from primitives of a previous frame in a first space;
    projecting the motion vectors from the first space to a second space, wherein a center point of the primitive is unaffected by translation and rotation in the second space; and
    producing the interpolated frame signal representative of an interpolated next frame by projecting the motion vectors to the interpolated next frame.

10. A graphic system of claim 9, wherein said perspective correction stage is further configured for performing the following:
    projecting to the second space the internal pixels of the primitives of the previous frame;
    moving from the previous frame to the interpolated next frame in the internal pixel second space of the interpolated next frame; and
    applying the projection of the interpolated next frame on the internal pixels of the primitives to return to the first space.

11. A graphic system of claim 9, wherein the primitives comprise triangles.

12. A graphic system of claim 9, wherein the first space is a screen space.

13. A graphic system of claim 9, wherein the second space is a view space.

14. A graphic system of claim 9, wherein the second space is a common space.

15. A graphic system of claim 14, wherein said perspective correction stage is further configured for performing the following:
    linearly interpolating the motion vectors from the primitives of the previous frame in the first space; and
    dividing the motion vectors by the respective division factors to return to the first space.

16. A graphic system of claim 15, wherein the first space is a screen space.

17. A method for pipelining graphical operations in a graphic system comprising:
    receiving processing instructions from a graphic application for a pipeline graphic engine comprising at least one geometric phase for performing motion extraction;
    operating the pipeline graphic engine for generating full image frames at a first frame rate for display at a second frame rate, the second frame rate being higher than the first frame rate;
    deriving from the at least one geometric phase motion information to be used as prediction information, and producing an interpolated frame signal representative of interpolated frames;
    generating the interpolated frames for display based upon the interpolated frame signal and the full image frames;
    producing depth buffer information associated with at least one currently computed frame; and
    allotting at least a portion of pixels in the at least one currently computed frame to a set background pixels based on the depth buffer information;
    wherein generating the interpolated frames is also based upon the motion information, the generating taking into account the depth buffer information and at least one of the forward and backward motion buffers by
        setting a pixel color to a background value if a pixel belongs to the background, otherwise controlling orientation of two motion vectors to carry out a quantization to a pixel position if needed, then
        if both vectors are within the forward frame and backward frame, then the pixel color is computed using the information addressed by the motion vectors, and
        if only one vector falls in a valid area of a fully rendered forward frame or backward frame, then the pixel color is computed by using the valid information of the fully rendered frame.

18. A method of claim 17, wherein the motion information being used as the prediction information is derived from motion vectors related to at least one of a backward frame and a forward frame included in the motion information.

19. A method of claim 18, wherein the deriving comprises associating motion vectors in at least one of a backward frame and a forward frame to potentially visible image primitives in at least one interpolated frame.

20. A method of claim 19, further comprising quantizing the motion vectors, and storing the motion vectors in at least one of a forward motion buffer and a backward motion buffer.

21. A method of claim 20, further comprising producing contents of at least one of the forward and backward motion buffers using a triangle setup phase.

22. A method of claim 17, further comprising allotting a remaining portion of the pixels in the at least one currently computed frame to a set of pixels in at least one image primitive.

23. A method of claim 17, wherein if both the motion vectors fall outside the frames of reference, then no operation is performed.

24. A method of claim 17, further comprising performing a scan-conversion process based on a linear interpolation of the motion vectors.

25. A method of claim 24, wherein the scan-conversion process comprises a linear interpolation of motion vectors with a perspective correction.

26. A method of claim 17, wherein the graphic system further comprises a perspective correction stage for performing a perspective correction for producing the interpolated frame signal representative of interpolated frames.

27. A method of claim 17, wherein the graphic system further comprises a perspective correction stage for performing a double perspective correction for producing the interpolated frame signal representative of interpolated frames by performing the following:
obtaining motion vectors from primitives of a previous frame in a first space;
projecting the motion vectors from the first space to a second space, wherein a center point of the primitive is unaffected by translation and rotation in the second space; and
producing the interpolated frame signal representative of an interpolated next frame by projecting the motion vectors to the interpolated next frame.

28. A method of claim 27, wherein the perspective correction stage is further configured for performing the following:
projecting to the second space the internal pixels of the primitives of the previous frame;
moving from the previous frame to the interpolated next frame in the internal pixel second space of the interpolated next frame; and
applying the projection of the interpolated next frame on the internal pixels of the primitives to return to the first space.

29. A computer-readable storage medium having computer-executable instructions for causing a graphical system to perform steps comprising:
receiving processing instructions from a graphic application for a pipeline graphic engine comprising at least one geometric phase for performing motion extraction;
operating the pipeline graphic engine for generating full image frames at a first frame rate for display at a second frame rate, the second frame rate being higher than the first frame rate;
deriving from the at least one geometric phase motion information to be used as prediction information, and producing an interpolated frame signal representative of interpolated frames, the motion information being used as the pred information being derived from motion vectors related to at least one of a backward frame and a forward frame included in the motion information,
generating the interpolated frames for display based upon the interpolated frame signal and the full image frames; and
quantizing the motion vectors, and storing the motion vectors in at least one of a forward motion buffer and a backward motion buffer;
wherein generating the interpolated frames is also based upon the motion information, the generating taking into account the depth buffer information and at least one of the forward and backward motion buffers by
setting a pixel color to a background value if a pixel belongs to the background, otherwise controlling orientation of two motion vectors to carry out a quantization to a pixel position if needed, then
if both vectors are within the forward frame and backward frame, then the pixel color is computed using the information addressed by the motion vectors, and
if only one vector falls in a valid area of a fully rendered forward frame or backward frame, then the pixel color is computed by using the valid information of the fully rendered frame.

30. A computer-readable storage medium of claim 29, wherein the deriving comprises associating motion vectors in at least one of a backward frame and a forward frame to potentially visible image primitives in at least one interpolated frame.

31. A computer-readable storage medium of claim 29, further comprising:
producing depth buffer information associated with at least one currently computed frame; and
allotting at least a portion of pixels in the at least one currently computed frame to a set of background pixels based on the de th buffer information.

32. A computer-readable storage medium of claim 29, further comprising allotting a remaining portion of the pixels in the at least one currently computed frame to a set of pixels in at least one image primitive.

33. A computer-readable storage medium of claim 29, wherein if both the motion vectors fall outside the frames of reference, then no operation is performed.

34. A computer-readable storage medium of claim 29, further comprising producing contents of at least one of the forward and backward motion buffers using a triangle setup phase.

35. A computer-readable storage medium of claim 29, further comprising performing a scan-conversion process based on a linear interpolation of the motion vectors.

36. A computer-readable storage medium of claim 35, wherein the scan-conversion process comprises a linear interpolation of motion vectors with a perspective correction.

37. A computer-readable storage medium of claim 29, wherein the graphic system further comprises a perspective correction stage for performing a perspective correction for producing the interpolated frame signal representative of interpolated frames.

38. A computer-readable storage medium of claim 29, wherein the graphic system further comprises a perspective correction stage for performing a double perspective correction for producing the interpolated frame signal representative of interpolated frames by performing the following:
obtaining motion vectors from primitives of a previous frame in a first space;

projecting the motion vectors from the first space to a second space, wherein a center point of the primitive is unaffected by translation and rotation in the second space; and producing the interpolated frame signal representative of an interpolated next frame by projecting the motion vectors to the interpolated next frame.

39. A graphic system comprising:
a pipelined graphic engine for generating image frames for display, said pipelined graphic engine comprising
at least one geometric processing stage for performing motion extraction, and
a rendering stage for generating full image frames at a first frame rate for display at a second frame rate, the second frame rate being higher than the first frame rate,
a motion encoder stage for receiving motion information from said at least one geometric processing stage, and for producing an interpolated frame signal representative of interpolated frames;
a motion compensation stage for receiving the interpolated frame signal from said motion encoder stage, and the full image frames from said rendering stage for generating the interpolated frames; and
a perspective correction stage for performing a double perspective correction so that said motion encoder stage produces the interpolated frame signal representative of interpolated frames, said perspective correction stage being configured for performing
obtaining motion vectors from primitives of a previous frame in a first space,
projecting, the motion vectors from the first space to a second space, wherein a center point of the primitive is unaffected by translation and rotation in the second space, and
producing the interpolated frame signal representative of an interpolated next frame by projecting the motion vectors to the interpolated next frame.

40. A graphic system of claim 39, further comprising a motion decoder stage upstream from said motion compensation stage.

41. A graphic system of claim 39, further comprising:
a video decoder stage for receiving the full image frames for display at the second frame rate; and
a frame buffer for receiving the full image frames from said video decoder stage, and for providing the full image frames to said motion compensation stage.

42. A graphic system of claim 39, wherein said at least one geometric processing stage comprises a geometry stage, and a triangle setup stage connected to an output of said geometry stage.

43. A graphic system of claim 39, further comprising a video encoder stage downstream from said rendering stage for generating a compressed bitstream.

44. A graphic system of claim 41, further comprising a multiplexer downstream from said frame buffer and from said motion compensation stage for selecting a display order for the full image frames and the interpolated frames.

45. A graphic system of claim 40, wherein said motion compensation stage is part of a display unit for displaying the full image frames at the second frame rate; and wherein said rendering stage and said motion encoder stage are integrated as a self-contained device with the display unit.

46. A graphic system of claim 40, further comprising a perspective correction stage for performing a perspective correction so that said motion encoder stage produces the interpolated frame signal representative of interpolated frames.

47. A method for pipelining graphical operations in a graphic system comprising:
receiving processing instructions from a graphic application for a pipeline graphic engine comprising at least one geometric phase for performing motion extraction;
operating the pipeline graphic engine for generating full image frames at a first frame rate for display at a second frame rate, the second frame rate being higher than the first frame rate;
deriving from the at least one geometric phase motion information to be used as prediction information, and producing an interpolated frame signal representative of interpolated frames; and
generating the interpolated frames for display based upon the interpolated frame signal and the full image frames;
wherein producing the interpolated frame signal representative of interpolated frames is based on performing a double perspective correction by performing the following
obtaining motion vectors from primitives of a previous frame in a first space,
projecting the motion vectors from the first space to a second space, with a center point of the primitive is unaffected by translation and rotation in the second space, and
producing the interpolated frame signal representative of an interpolated next frame by projecting the motion vectors to the interpolated next frame.

48. A method of claim 47, wherein the motion information being used as the prediction information is derived from motion vectors related to at least one of a backward frame and a forward frame included in the motion information.

49. A method of claim 47, wherein the deriving comprises associating motion vectors in at least one of a backward frame and a forward frame to potentially visible image primitives in at least one interpolated frame.

50. A method of claim 47, further comprising quantizing the motion vectors, and storing the motion vectors in at least one of a forward motion buffer and a backward motion buffer.

51. A method of claim 47, further comprising:
producing depth buffer information associated with at least one currently computed frame; and
allotting at least a portion of pixels in the at least one currently computed frame to a set of background pixels based on the depth buffer information.

52. A method of claim 51, further comprising allotting a remaining portion of the pixels in the at least one currently computed frame to a set of pixels in at least one image primitive.

* * * * *

UNITED STATES PATENT AND TRADEMARK OFFICE
CERTIFICATE OF CORRECTION

PATENT NO. : 7,990,389 B2
APPLICATION NO. : 11/746849
DATED : August 2, 2011
INVENTOR(S) : Barone et al.

It is certified that error appears in the above-identified patent and that said Letters Patent is hereby corrected as shown below:

Column 1, Line 66      Delete: "SD"
Insert: --3D--

Column 8, Line 43      Delete: "F2=1S"
Insert: --F2=15--

Column 11, Line 59      Delete: "$v(x_l,y_l,z_l)$"
Insert: --$v(x_t,y_t,z_t)$--

Column 11, Line 60      Delete: "$(x_l,y_l,z_l)$"
Insert: --$(x_t,y_t,z_t)$--

Column 13, Line 4      Delete: "$f_1, f_1, f_2, f_5, f_4, ..., f_n, f_{n-1}$,"
Insert: --$f_1, f_3, f_2, f_5, f_4, ..., f_n, f_{n-1}$,--

Column 16, Line 51      Delete: "$ca, cb_i$"
Insert: --$ca_i, cb_i$--

Column 16, Line 52      Delete: "$(x_{pre}, y^{pre}, z^{pre}, z^{ZbufferPre})$"
Insert: --$(x^{pre}, y^{pre}, z^{pre}, z^{ZbufferPre})$--

Column 26, Line 3      Delete: "pred"
Insert: --prediction--

Column 26, Line 5      Delete: "information,"
Insert: --information;--

Column 26, Line 31      Delete: "de th"
Insert: --depth--

Signed and Sealed this
Twenty-fifth Day of September, 2012

David J. Kappos
*Director of the United States Patent and Trademark Office*